(12) United States Patent
Ohtake

(10) Patent No.: US 7,558,003 B2
(45) Date of Patent: Jul. 7, 2009

(54) ZOOM LENS AND IMAGING APPARATUS

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 208 days.

(21) Appl. No.: 10/581,550

(22) PCT Filed: Sep. 30, 2005

(86) PCT No.: PCT/JP2005/018128

§ 371 (c)(1),
(2), (4) Date: Mar. 20, 2007

(87) PCT Pub. No.: WO2006/040948

PCT Pub. Date: Apr. 20, 2006

(65) Prior Publication Data

US 2008/0212184 A1    Sep. 4, 2008

(30) Foreign Application Priority Data

Oct. 14, 2004    (JP)    ................................. 2004-30053

(51) Int. Cl.
*G02B 15/14*    (2006.01)
*G02B 27/64*    (2006.01)
*G03B 17/00*    (2006.01)
(52) U.S. Cl. .......................... 359/684; 359/557; 396/55
(58) Field of Classification Search ............. 348/240.3, 348/240.99; 359/557, 676, 684; 396/55, 396/72

See application file for complete search history.

(56) References Cited

U.S. PATENT DOCUMENTS

| 5,548,445 A | * | 8/1996 | Yahagi | ........................ 359/677 |
| 7,038,858 B2 | * | 5/2006 | Ohashi | ........................ 359/685 |
| 7,385,766 B2 | * | 6/2008 | Ohtake | ........................ 359/676 |

FOREIGN PATENT DOCUMENTS

| EP | 1705508 A1 | * | 9/2006 |
| JP | 07-261080 A | | 10/1995 |
| JP | 09-090221 A | | 4/1997 |
| JP | 2002-098895 A | | 4/2002 |

(Continued)

OTHER PUBLICATIONS

PCT International Search Report for PCT/JP2005/018128 mailed on Jan. 17, 2006.

(Continued)

*Primary Examiner*—David N Spector
(74) *Attorney, Agent, or Firm*—Rader Fishman & Grauer PLLC; Ronald P. Kananen

(57) ABSTRACT

An electrode for an extra-high pressure discharge lamp, comprises large diameter portion which is symmetrical with respect to an axis of the electrode, a small diameter portion connected to the large diameter portion, wherein the large diameter portion is connected to the small diameter portion through an outer surface portion of the electrode, wherein a stripe lines like pattern portion, extending along an electrode axis direction, is formed on a portion to be brought in contact with glass of a lamp, and wherein unevenness is formed over an entire circumference of the electrode in a cross sectional view of the electrode taken along a direction perpendicular to the electrode axis direction.

16 Claims, 23 Drawing Sheets

FOREIGN PATENT DOCUMENTS

| | | |
|---|---|---|
| JP | 2002-244037 A | 8/2002 |
| JP | 2003-228001 A | 8/2003 |
| JP | 2003-295057 A | 10/2003 |

OTHER PUBLICATIONS

PCT International Search Opinion for PCT/JP2005/018128 mailed on Jan. 17, 2006.

Extended European Search Report date Jun. 3, 2008 for corresponding European Application No. 05 78 8267.

Notification of Transmittal of Translation of the International Preliminary Report on Patentability dated Apr. 26, 2007, for PCT/JP2005/018128.

International Preliminary Report on Patentability dated Apr. 17, 2007, for PCT/JP2005/018128.

Written Opinion of International Searching Authority, for PCT/JP2005/018128.

* cited by examiner

TRANSVERSE ABERRATIONS

TRANSVERSE
ABERRATIONS

TRANSVERSE ABERRATIONS

TRANSVERSE ABERRATIONS

TRANSVERSE
ABERRATIONS

TRANSVERSE
ABERRATIONS

TRANSVERSE ABERRATIONS

US 7,558,003 B2

ZOOM LENS AND IMAGING APPARATUS

TECHNICAL FIELD

The present invention relates to a zoom lens and an imaging apparatus, and more specifically, to an imaging apparatus device suited for use with cameras, such as video cameras or digital still cameras, that receive light from an imaging device. The invention also relates to a zoom lens and an imaging apparatus that use the zoom lens suited for motion blur compensation.

BACKGROUND ART

Conventionally, methods are known that convert an image of an object (object image) formed on an imaging device plane by using the imaging device that utilizes photoelectric transducers, such as CCDs (charge coupled devices) and CMOSs (complementary metal-oxide semiconductors), and that thereby record the image.

With advancements in microprocessing technology, there have been implemented, for example, processing rate enhancements of central processing units (CPUs) and higher level integration of storage mediums, thereby enabling high speed processing of a large volume of image data that have not been able to be handled before. In addition, also for photoreceptor devices, enhancements in high-level integration, compactness, and the like have been implemented, in which the high-level integration has enabled even higher spatial frequency recording, and the compactness has enabled overall camera compactness.

Further, so as to be able to be used in wide range photographic conditions, the demand for zoom lenses has been increased, and more specifically, the demand has been increased for high zoom ratios.

However, in an optical system with a high zoom ratio, since the angle of viewing is narrowed in a telephoto end mode, even a small motion blur causes the occurrence of a large blur in the image. As such, especially for video cameras with high zoom ratios, so-called electronic motion blur compensation systems are known that cause shifting of an image capture range of the photoreceptor device in order to compensate for the motion blur.

In addition, conventionally, so-called motion blur compensation optical systems are known that cause shifting of some lens groups constituting a lens system in the substantially vertical direction with respect to the optical axis, thereby to compensate for optical performance deterioration in the event of shifting of the image position.

In a motion blur compensation optical system of the above-described type, the function of an optical motion blur compensation system can be obtained from the combination of a detection system for detecting such image blur caused by camera shaking that occurs in association with motion blur caused with shutter releasing operation, a control system for imparting a compensation amount to the lens position in accordance with a signal detected from the detection system, and a drive system that causes shifting of a predetermined lens in accordance with an output from the control system.

According to the optical motion blur compensation system, an image can be shifted in accordance with lens shift performed by the drive system, such that the blur associated with the blur in the camera can be compensated for in accordance with the lens shift performed by the drive system.

Motion blur compensation optical systems of the above-described type are known as disclosed in for example, Japanese Patent Laid-open Publications No. 2002-244037, No. 2003-228001, and No. 2003-295057.

According to a zoom lens disclosed in Japanese Patent Laid-open Publication No. 2002-244037, a third lens group disposed on the image side of an aperture diaphragm is configured to include a negative sub lens group, in which the image is shifted by shifting the positive sub lens group.

According to a zoom lens disclosed in Japanese Patent Laid-open Publication No. 2003-228001, a third lens group disposed on the image side of an aperture diaphragm is configured to include a negative sub lens group, in which the image is shifted by shifting the positive sub lens group.

According to a zoom lens disclosed in Japanese Patent Laid-open Publication No. 2003-295057, the image is shifted by shifting the entirety of a third lens group.

In the conventional motion blur compensation optical systems, the lens group disposed near the aperture diaphragm is shifted, such that interferences tend to occur among a drive mechanism of causing the shifting, a mechanism of opening and closing the aperture diaphragm, and a mechanism of moving the respective lens in the event of, for example, zooming or focusing, so that a lens barrel has to be enlarged in the radial direction.

An object of the present invention is to solve the problems described above, thereby to provide a zoom lens and an imaging apparatus using the zoom lens, the zoom lens being suited for achieving compactness without increasing the number of lenses and being capable of implementing motion blur compensation.

DISCLOSURE OF INVENTION

In order to solve the problems described above, a zoom lens according to the present invention comprises lenses arranged in order from an object side into a first lens group having positive refractive power, a second lens group having negative refractive power, a third lens group having positive refractive power, a fourth lens group having positive refractive power, and a fifth lens group having positive refractive power. In the event of a shift of a lens position mode from a wide angle end mode to a telephoto end mode, the first lens group is fixed along an optical axis direction, the second lens group moves to an image side, the third lens group is fixed along the optical axis direction, the fourth lens group compensates for a fluctuation in an image plane position due to the shift of the second lens group, and concurrently moves along the optical axis direction in a close-distance focusing event, and the fifth lens group is fixed along the optical axis direction. An aperture diaphragm is disposed in the vicinity of the third lens group. The fifth lens group includes a negative sub lens group having negative refractive power and a positive sub lens group having a positive refractive power, wherein the image can be shifted in conjunction with a shift of the positive sub lens group in a direction substantially perpendicular to the optical axis. Where f5p is a focal distance of the positive sub lens group disposed in the fifth lens group, and Da is a length extending along the optical axis to a paraxial image position from a most-imagewise surface of the positive sub lens group disposed in the fifth lens group, the zoom lens satisfies conditional equation (1):

$$0.6 < f5p/Da < 1.4 \quad (1)$$

In addition, in order to solve the problems described above, an imaging apparatus comprises a zoom lens and an imaging device that converts an optical image formed through the zoom lens to an electric signal. The zoom lens comprises lenses arranged in order from an object side into a first lens group having positive refractive power, a second lens group having negative refractive power, a third lens group having positive refractive power, a fourth lens group having positive refractive power, and a fifth lens group having positive refractive power. In the event of a shift of a lens position mode from a wide angle end mode to a telephoto end mode, the first lens group is fixed along an optical axis direction, the second lens group moves to an image side, the third lens group is fixed along the optical axis direction, the fourth lens group compensates for a fluctuation in an image plane position due to the shift of the second lens group, and concurrently moves along the optical axis direction in a close-distance focusing event, and the fifth lens group is fixed along the optical axis direction. An aperture diaphragm is disposed in the vicinity of the third lens group. The fifth lens group includes a negative sub lens group having negative refractive power and a positive sub lens group having a positive refractive power, wherein the image can be shifted in conjunction with a shift of the positive sub lens group in a direction substantially perpendicular to the optical axis. Where f5p is a focal distance of the positive sub lens group disposed in the fifth lens group, and Da is a length extending along the optical axis to a paraxial image position from a most-imagewise surface of the positive sub lens group disposed in the fifth lens group, the zoom lens satisfies conditional equation (1):

$$0.6 < f5p/Da < 1.4 \tag{1}$$

Accordingly, in the present invention, the fifth lens group, which is a fixed lens group, is disposed on the image side of the fourth lens group, which is a movable lens group. When shifting the image, a lens (group) located away from the aperture diaphragm is shifted in the direction substantially perpendicular to the optical axis.

A zoom lens according to the present invention comprises lenses arranged in order from an object side into a first lens group having positive refractive power, a second lens group having negative refractive power, a third lens group having positive refractive power, a fourth lens group having positive refractive power, and a fifth lens group having positive refractive power. The zoom lens is characterized in that in the event of a shift of a lens position mode from a wide angle end mode to a telephoto end mode, the first lens group is fixed along an optical axis direction, the second lens group moves to an image side, the third lens group is fixed along the optical axis direction, the fourth lens group compensates for a fluctuation in an image plane position due to the shift of the second lens group, and concurrently moves along the optical axis direction in a close-distance focusing event, and the fifth lens group is fixed along the optical axis direction; an aperture diaphragm is disposed in the vicinity of the third lens group; the fifth lens group includes a negative sub lens group having negative refractive power and a positive sub lens group having a positive refractive power, wherein the image can be shifted in conjunction with a shift of the positive sub lens group in a direction substantially perpendicular to the optical axis; and where f5p is a focal distance of the positive sub lens group disposed in the fifth lens group, and Da is a length extending along the optical axis to a paraxial image position from a most-imagewise surface of the positive sub lens group disposed in the fifth lens group, the zoom lens satisfies conditional equation (1):

$$0.6 < f5p/Da < 1.4 \tag{1}$$

An imaging apparatus comprises a zoom lens and an imaging device that converts an optical image formed through the zoom lens to an electric signal. The imaging apparatus is characterized in that the zoom lens includes lenses arranged in order from an object side into a first lens group having positive refractive power, a second lens group having negative refractive power, a third lens group having positive refractive power, a fourth lens group having positive refractive power, and a fifth lens group having positive refractive power, wherein in the event of a shift of a lens position mode from a wide angle end mode to a telephoto end mode, the first lens group is fixed along an optical axis direction, the second lens group moves to an image side, the third lens group is fixed along the optical axis direction, the fourth lens group compensates for a fluctuation in an image plane position due to the shift of the second lens group, and concurrently moves along the optical axis direction in a close-distance focusing event, and the fifth lens group is fixed along the optical axis direction; an aperture diaphragm is disposed in the vicinity of the third lens group; the fifth lens group includes a negative sub lens group having negative refractive power and a positive sub lens group having a positive refractive power, wherein the image can be shifted in conjunction with a shift of the positive sub lens group in a direction substantially perpendicular to the optical axis; and where f5p is a focal distance of the positive sub lens group disposed in the fifth lens group, and Da is a length extending along the optical axis to a paraxial image position from a most-imagewise surface of the positive sub lens group disposed in the fifth lens group, the zoom lens satisfies conditional equation (1):

$$0.6 < f5p/Da < 1.4 \tag{1}$$

Accordingly, in the present invention, with the fifth lens group arranged, the number of lenses constituting the fourth lens group, which is movable, is reduced, and the weight thereof is thereby reduced. Consequently, the structure of a mechanism for driving the fourth lens group is simplified, thereby enabling the lens system to be compact.

In addition, when mounting a motion blur compensation mechanism, a mechanism for shifting the lens along the direction substantially perpendicular to the optical axis does not interfere with, for example, a lens driving mechanism for zooming and focusing and an aperture diaphragm opening/closing mechanism. Consequently, the size of a lens barrel, and especially, the size in the radial direction can be reduced, and compactness can be accomplished.

Since conditional equation (1) is satisfied, a drive mechanism for shifting the positive sub lens group of the fifth lens group can be configured to be compact. In addition, the total lens length can be reduced, and the eccentric coma occurring in the central portion of the screen can be prevented from being excessively increased during the shift event ("image shift", hereafter) of the positive sub lens group.

The invention, in the embodiment also, satisfies conditional equation (2) given as $0.5 < f5p/Db < 1.3$), where Db is a length extending along the optical axis to the aperture diaphragm from a most-object-side surface of the positive sub lens group disposed in the fifth lens group. Accordingly, fluctuations in off-axis aberrations occurring during the image shift can be sufficiently compensated for.

The invention defined in other embodiments also satisfies conditional equation (3) given as $0.3 < |f5n|/ft < 0.9$, where f5n is a focal distance of the negative sub lens group disposed in the fifth lens group, and ft is a focal distance of a total lens system in the telephoto end mode. Accordingly, the positive spherical aberrations occurring in the negative sub lens group of the fifth lens group can be sufficiently compensated for.

The invention defined in some other embodiments satisfies conditional equation (4) given as $-5 < C5p \cdot ft < -2$, where C5p is a curvature (reciprocal of a radius of the curvature) of the most-image-side lens surface of the positive sub lens group disposed in the fifth lens group. Accordingly, the various aberrations occurring in the positive sub lens group of the fifth lens group can be sufficiently compensated for, and high optical performance can be obtained also during the image shift.

BEST MODE FOR CARRYING OUT THE INVENTION

Figure 1:
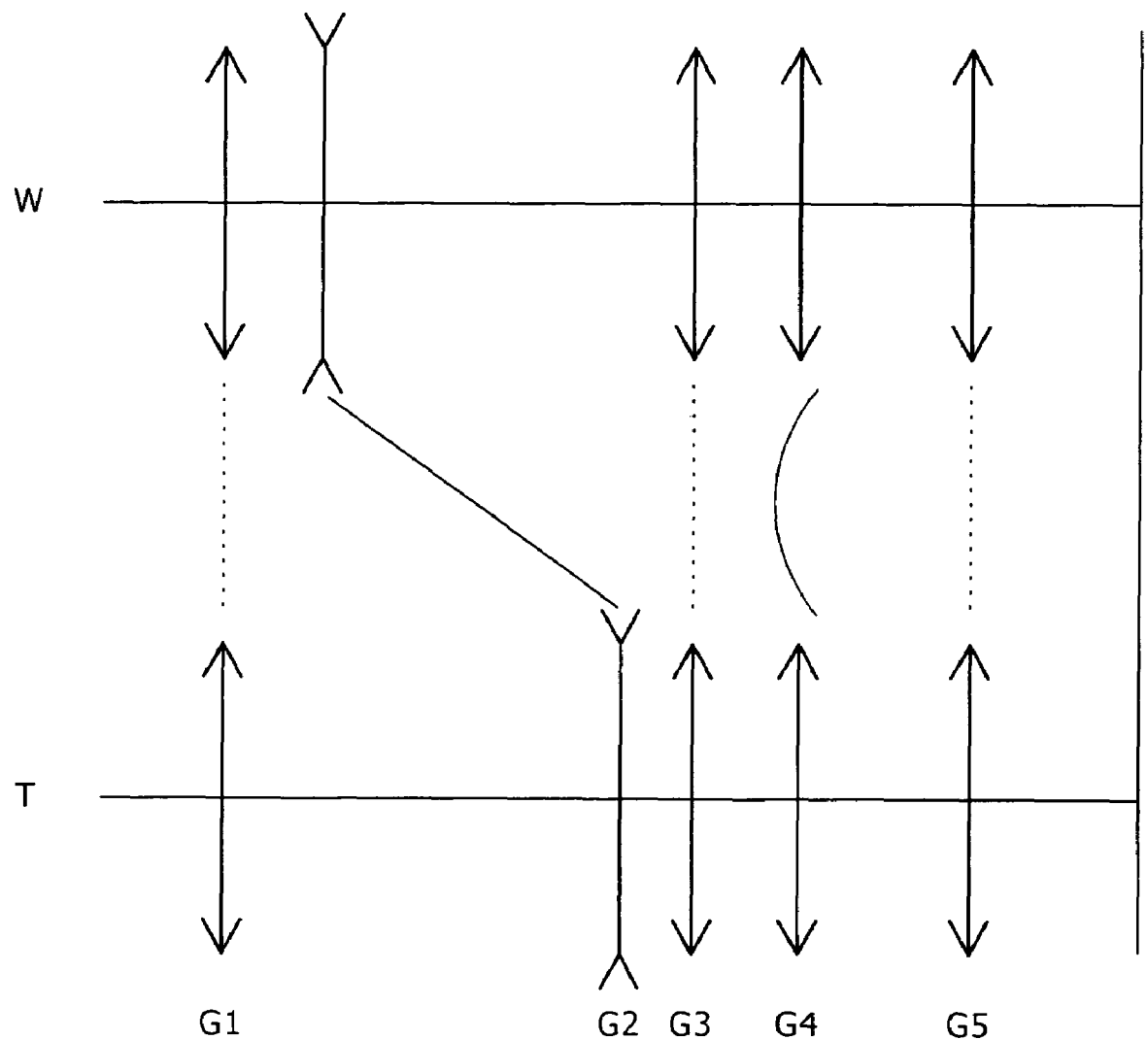
FIG. 1 is a schematic view showing a refractive power arrangement of a zoom lens according to the present invention (or, "present inventive zoom lens", hereafter) and possibilities or impossibilities for movability of respective lens groups.

The best mode for practicing a zoom lens and an imaging apparatus of the present invention will be described with reference to the accompanying drawings.

The present inventive zoom lens includes lenses arranged in order from an object side into a first lens group having positive refractive power, a second lens group having negative refractive power, a third lens group having positive refractive power, a fourth lens group having positive refractive power, and a fifth lens group having positive or negative refractive power.

The second lens group has a zoom function, the fourth lens group has a compensation function, and they are combined together, whereby in the event the second lens group moves from the object side to the image side, the focal distance shifts from a wide angle end mode to a telephoto end mode with the image plane position maintained constant.

In addition to the compensation function, the fourth lens group has a focus function, thereby to compensate for fluctuations in the image plane position due to fluctuations in the subject position.

The fifth lens group includes a negative sub lens group and a positive sub lens group disposed on the image side thereof via air spacing therebetween, in which the image shift is performed by shifting the positive sub lens group along the direction substantially perpendicular to the optical axis.

An aperture diaphragm is disposed near the third lens group.

In the present inventive zoom lens, the second and fourth lens groups are configured to be movable along the optical axis direction, such that a driving method similar to the conventional driving method used in the event of, for example, zooming or focusing, can be employed. In addition, the image shift is performed in the manner that a positive sub lens group of the fifth lens group disposed closer to the image side than to the fourth lens group is moved along the direction substantially perpendicular to the optical axis, the interference between a drive mechanism used in the event of, for example, zooming or focusing and a mechanism of actuating the aperture diaphragm is reduced, the distances between the respective lens groups can be narrowed. As a consequence, the lens system can be compacted, and the image shift can be accomplished in the state where the image deterioration is reduced in the event of motion blur compensation.

In addition, according to the present inventive zoom lens, even when the image shift is not performed, sufficiently high optical performance can be exhibited. In many conventional zoom lenses, in which a color separation prism is disposed on the image side of the optical system, and the movable fourth lens group includes three lenses. As such, since the fourth lens group is heavy, there are adjacent problems that make it difficult to attain, for example, improvement in autofocus speeds and simplification of the configuration of the drive mechanism. However, according to the present inventive zoom lens, the fifth lens group fixed along the optical axis direction is disposed on the image side of the movable fourth lens group, whereby the number of lenses constituting the fourth lens group can be reduced, and in association with reduction in the weight of the fourth lens group, the autofocus speeds can be improved, and the configuration of the drive mechanism for driving the fourth lens group can be simplified.

According to the present inventive zoom lens, conditional equation (1) below is satisfied, where f5p is the focal distance of the positive sub lens group disposed in the fifth lens group, and Da is the length extending along the optical axis to a paraxial image position from a most-imagewise surface of the positive sub lens group disposed in the fifth lens.

$$0.6 < f5p/Da < 1.4 \tag{1}$$

Conditional equation (1) defines the ratio between the focal distance and the back-focus of the positive sub lens group disposed in the fifth lens group, thereby to define a blur compensation coefficient.

More specifically, the blur compensation coefficient is the ratio of the image shift amount to the lens shift amount in the event that a predetermined lens group is moved substantially perpendicular to the optical axis. According to the present invention, the shift lens group (positive sub lens group in the fifth lens group) is disposed on the most-image-side, such that a blur compensation coefficient γ is defined by the following equation, where the transverse scale factor of the positive sub lens group is βs.

$$\gamma = 1 - \beta s$$

For example, when conditional equation (1) yields 1, an axial light flux incident on the positive sub lens group is similar to parallel light, and βs becomes substantially 0, so that the blur compensation coefficient γ takes a numerical value close to 1. When the conditional equation (1) yields a numerical value greater than 1, βs takes a positive value; conversely, however, when conditional equation (1) yields a numerical value less than 1, βs takes a negative value.

According to the present inventive zoom lens, when the upper limit value of conditional equation (1) is exceeded, the blur compensation coefficient is reduced, whereby the lens shift amount is excessively increased in the event of the image shift of a predetermined amount, thereby requiring the drive mechanism to be enlarged.

Conversely, in the event that the lower limit value of conditional equation (1) is exceeded, increasing the denominator requires the total lens length to be increased. Conversely, when the numerator decreases, the focal distance of the shift lens group is excessively short, such that eccentric coma occurring in a central portion of the screen during the image shift is increased, thereby to make it difficult to compensate therefor and consequently making it impossible to secure a predetermined optical performance.

In order to sufficiently compensate for fluctuations in off-axis aberrations occurring during the image shift, the present inventive zoom lens preferably satisfies conditional equation (2) given below, where Db is the length extending along the optical axis to the aperture diaphragm from the most-object-side surface of the positive sub lens group disposed in the fifth lens group.

$$0.5 < f5p/Db < 1.3 \tag{2}$$

Conditional equation (2) defines the ratio between the focal distance of the positive sub lens group in the fifth lens group and the distance the aperture diaphragm and positive sub lens group, thereby defines the position of an exit pupil.

When the upper limit value of conditional equation (2) is exceeded, the position of the exit pupil approaches to the image plane position, that is, the primary light beam to be incident on the CCD proceeds in such a manner as to be away from the optical axis, such that it is unavoidable that the lens diameters have to be increased to obtain a predetermined amount of peripheral light.

Conversely, in the event that the lower limit value of conditional equation (2) is exceeded, increasing the denominator requires the total lens length to be increased. Conversely, when the numerator decreases, fluctuation in the incident angle is excessively large during the lens shift. As a consequence, although the motion blur is sufficiently compensated for in the central portion of the screen, the image blur cannot be compensated for in the peripheral portion of the screen.

According to the present invention, in order to further enhance the performance, it is preferable that conditional equation (3) is satisfied, where f5n is the focal distance of the negative sub lens group disposed in the fifth lens group, and ft is the focal distance of the total lens system in the telephoto end mode.

$$0.3 < |f5n|/ft \tag{3}$$

Conditional equation (3) defines the focal distance of the negative sub lens group in the fifth lens group.

When the lower limit value of conditional equation (3) is exceeded, it is difficult to even more sufficiently compensate for spherical aberrations occurring in the negative sub lens group, such that a predetermined optical performance cannot be obtained.

In the present inventive zoom lens, in order to obtain further improved optical performance even during the image shift by sufficiently compensating for the various aberrations occurring only with the positive sub lens group in the fifth lens group, it is preferable that the positive sub lens group be formed of at least one positive lens and one negative lens, thereby to satisfy conditional equation (4) given below, where C5p is the curvature (reciprocal of the radius of the curvature) of the most-image-side lens surface of the positive sub lens group disposed in the fifth lens group.

$$-5 < C5p \cdot ft < -2 \tag{4}$$

Conditional equation (4) defines the radius of curvature of the most-image-side lens surface of the positive sub lens group.

When the upper limit value of the conditional equation (4) is exceeded (radius of curvature is increased), coma occurring in the central portion of the screen during the image shift cannot be restrained.

Conversely, when the lower limit value of the conditional equation (4) is exceeded (radius of curvature is reduced), the fluctuation in coma occurring in the peripheral portion of the screen is increased.

According to the present inventive zoom lens, the optical performance can be further improved by use of an aspherical lens. Especially, the central area optical performance can be further improved by using an aspheric surface in the fifth lens group. Further, compensation can be made for coma caused due to the angle of viewing in the wide angle end mode.

Further, of course the optical performance can be further improved by use of a plurality of aspheric surfaces.

Further, in order to prevent the occurrence of a Moire pattern, of course it is possible to dispose, for example, a low pass filter, or an infrared cut filter on the image side of the fifth lens group depending on the spectral sensitivity characteristics of the photoreceptor device such as a CCD.

Respective embodiments and numerical examples of present inventive zoom lenses will be described below.

In each of the respective embodiments, the aspheric surface is used, and the aspheric surface profile is represented by Equation (1) below.

$$x = cy^2/(1+(1-(1-\kappa)c^2y^2)^{1/2}) + c_4 y^4 + c_6 y^6 + \ldots \quad (1)$$

In this case,
y=height from the optical axis;
x=sag amount;
c=curvature;
κ=conic constant; and
$c_4, c_6, \ldots$ =aspheric surface coefficient.

FIG. 1 shows refractive power allocations of a zoom lens according to the respective embodiment of the present invention. The zoom lens includes lenses arranged in order from the object side into a first lens group G1 having the positive refractive power, a second lens group G2 having the negative refractive power, a third lens group G3 having the negative refractive power, a fourth lens group G4 having the positive refractive power, and a fifth lens group G5 having the positive or negative refractive power. In the event of zooming from the wide angle end mode to the telephoto end mode, the second lens group G2 moves such that the air spacing between the first lens groups G1 and G2 increases and the air spacing between the second lens groups G2 and G3 reduces. In this event, the first, third, and fifth lens groups G1, G3, and G5 are fixed along the optical axis direction; and the fourth lens group G4 moves to allow compensation for fluctuations in the image plane position associated with the movement of the second lens group G2, and moves to the object side in a close-distance focusing event.

Figure 2:
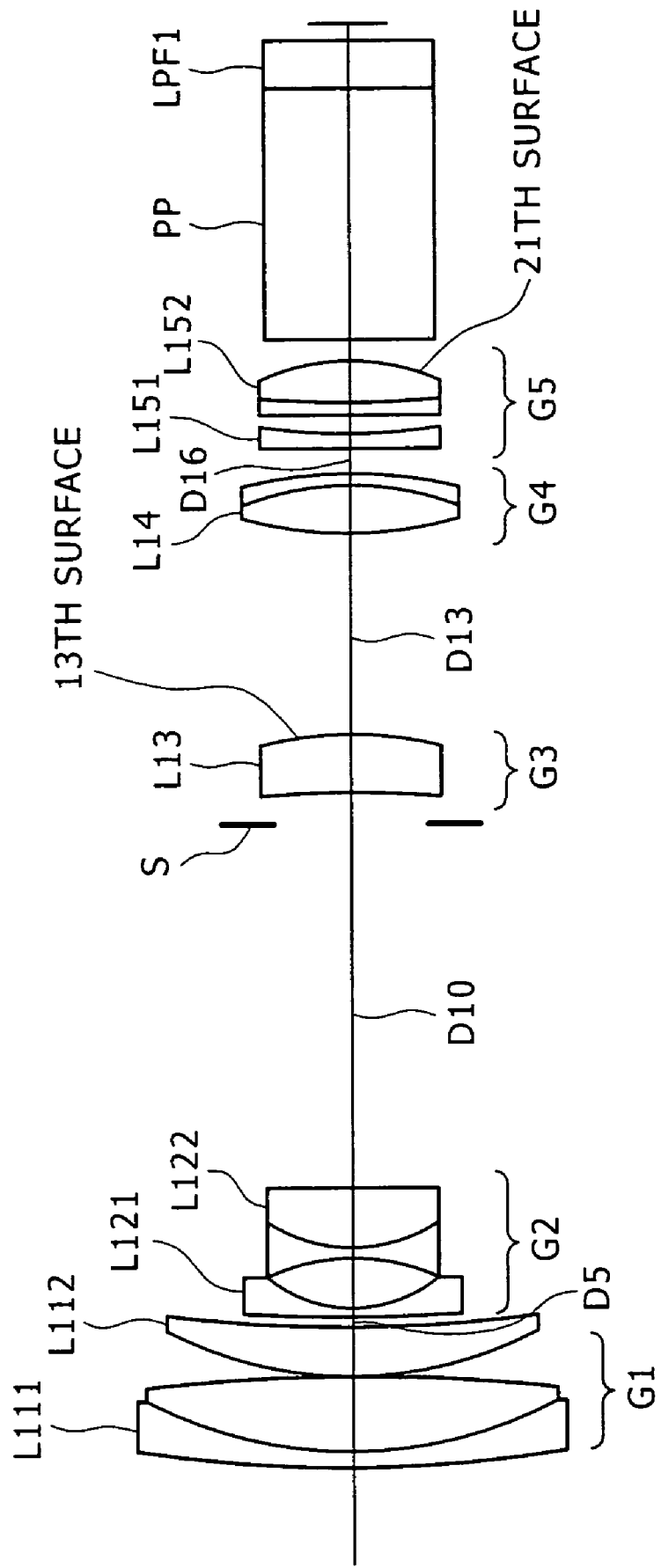
FIG. 2 is a view showing a lens configuration according to a first embodiment of the present inventive zoom lens.

FIG. 2 shows a lens configuration according to a first embodiment of the present inventive zoom lens, in which a first lens group G1 is formed of a cemented lens L111 of a meniscus-shaped negative lens with the convex surface facing the object side, and a positive lens L112 with the convex surface facing the object side; a second lens group G2 is formed of a negative lens L121 with the concave surface facing the image side, and a cemented lens L122 of a both-side concave shaped negative lens and a positive lens with the convex surface facing the object side; a third lens group G3 is formed of a positive meniscus lens L13; a fourth lens group G4 is formed of a cemented positive lens L14 of a both-side convex lens and a meniscus-shaped negative lens with the concave surface facing the object side; and a fifth lens group G5 is formed of a negative lens L151 with the concave surface facing the image side, and a cemented positive lens L152 of a both-side convex lens and a meniscus-shaped negative lens with the concave surface facing the object side.

In the first embodiment, an aperture diaphragm S is disposed on the object side of the third lens group G3 and fixed during the shift in the lens position mode.

In the first embodiment, the negative lens L151 disposed in the fifth lens group functions as a negative sub lens group, and the cemented positive lens L152 functions as a positive sub lens group, in which the image can be shifted by the shift of the cemented positive lens L152 along the direction perpendicular to the optical axis. In addition, a prism PP and a low pass filter LPF1 are disposed on the image side of the fifth lens group G5.

Table 1 shows various values in a numerical example 1 in the event that practical numerical values are adapted to the first embodiment. In respective tables of various numerical values in accordance with the numerical example 1 and below-described numerical examples, f is the focal distance, FNo is the F number, 2ω is the angle of viewing; and the refractive power and Abbe's number are shown in the values with respect to the d line (λ=587.6 nm). In Table 1, the radius of curvature shown with 0 is indicative of the flat surface.

TABLE 1 f 2.94~7.31~27.6
F NO 1.72~1.80~2.79
2ω 56.73~22.28~5.93°

| Surface No. | Radius of Curvature | Inter-surface Distance | Refraction Index | Abbe's Number |
|---|---|---|---|---|
| 1: | 58.6067 | 0.700 | 1.84666 | 23.8 |
| 2: | 19.1434 | 3.250 | 1.60738 | 56.8 |
| 3: | −66.3164 | 0.140 | | |
| 4: | 18.6022 | 2.100 | 1.80400 | 46.6 |
| 5: | 72.8181 | (D5) | | |
| 6: | 72.8181 | 0.400 | 1.83500 | 43.0 |
| 7: | 6.2198 | 2.150 | | |
| 8: | −8.1923 | 0.500 | 1.74430 | 49.2 |
| 9: | 7.3027 | 2.394 | 1.92286 | 20.9 |
| 10: | 0.0000 | (D10) | | |
| 11: | 0.0000 | 1.390 | (Aperture Diaphragm) | |
| 12: | −36.6362 | 2.500 | 1.48749 | 70.4 |
| 13: | −13.2678 | (D13) | | |
| 14: | 18.7886 | 2.150 | 1.77250 | 49.6 |
| 15: | −11.2294 | 0.450 | 1.92286 | 20.9 |
| 16: | −19.5023 | (D16) | | |
| 17: | −63.8851 | 0.600 | 1.83400 | 37.4 |
| 18: | 29.2408 | 0.800 | | |
| 19: | 287.7006 | 0.500 | 1.92286 | 20.9 |
| 20: | 49.9719 | 1.750 | 1.69350 | 53.2 |
| 21: | −10.4358 | 1.000 | | |
| 22: | 0.0000 | 11.000 | 1.58913 | 61.3 |
| 23: | 0.0000 | 1.900 | 1.51680 | 64.2 |
| 24: | 0.0000 | (Bf) | | |

The respective lens surfaces corresponding to the 13th and 21st surfaces are formed of aspheric surfaces, and the aspheric surface coefficients thereof are shown in Table 2. In Table 2 and subsequent tables showing the aspheric surface coefficients, "E–i" is an exponential expression with base 10, indicating "$10^{-i}$"; more specifically, "0.26029E–05" indicates "$0.26029 \times 10^{-5}$", for example.

TABLE 2

| | [13th Surface] | |
|---|---|---|
| $\kappa = +0.000$ | $C_4 = +0.23076 \times 10^{-3}$ | $C_6 = +0.70769 \times 10^{-5}$ |
| | $C_8 = -0.32205 \times 10^{-6}$ | $C_{10} = +0.11069 \times 10^{-7}$ |
| | [21st Surface] | |
| $\kappa = +0.000$ | $C_4 = +0.38815 \times 10^{-3}$ | $C_6 = -0.34876 \times 10^{-5}$ |
| | $C_8 = +0.21930 \times 10^{-6}$ | $C_{10} = -0.53874 \times 10^{-8}$ |

In conjunction with the shift of the lens position mode from the wide angle end mode to the telephoto end mode, there are varied an inter-surface distance D5 between the first and second lens groups G1 and G2, an inter-surface distance D10 between the second lens group G2 and the aperture diaphragm S, an inter-surface distance D13 between the third and fourth lens groups G3 and G4, and an inter-surface distance D16 between the fourth and fifth lens groups G4 and G5. Table 3 shows, together with focal distances f, values of the respective inter-surface distances in the wide angle end mode, intermediate focal distance mode between the wide angle end position and the telephoto end position, and the telephoto end mode.

TABLE 3

(Table of Variable Distances)

| | f | | |
|---|---|---|---|
| | 2.940 | 7.312 | 27.628 |
| D5 | 0.420 | 7.353 | 13.851 |
| D10 | 15.971 | 9.038 | 2.540 |
| D13 | 8.830 | 6.942 | 8.808 |
| D16 | 1.192 | 3.079 | 1.213 |
| Bf | 0.811 | 0.811 | 0.811 |

Table 4 shows corresponding values to the conditional equations (1), (2), (3), and (4) in accordance with the numerical example 1.

TABLE 4

| f5n = –12.864 |
|---|
| f5p = +13.559 |
| (1) f5p/Da = 0.922 |
| (2) f5p/Db = 0.757 |
| (3) |f5n|/ft = 0.466 |
| (4) C5p · ft = –2.647 |

Figure 3:
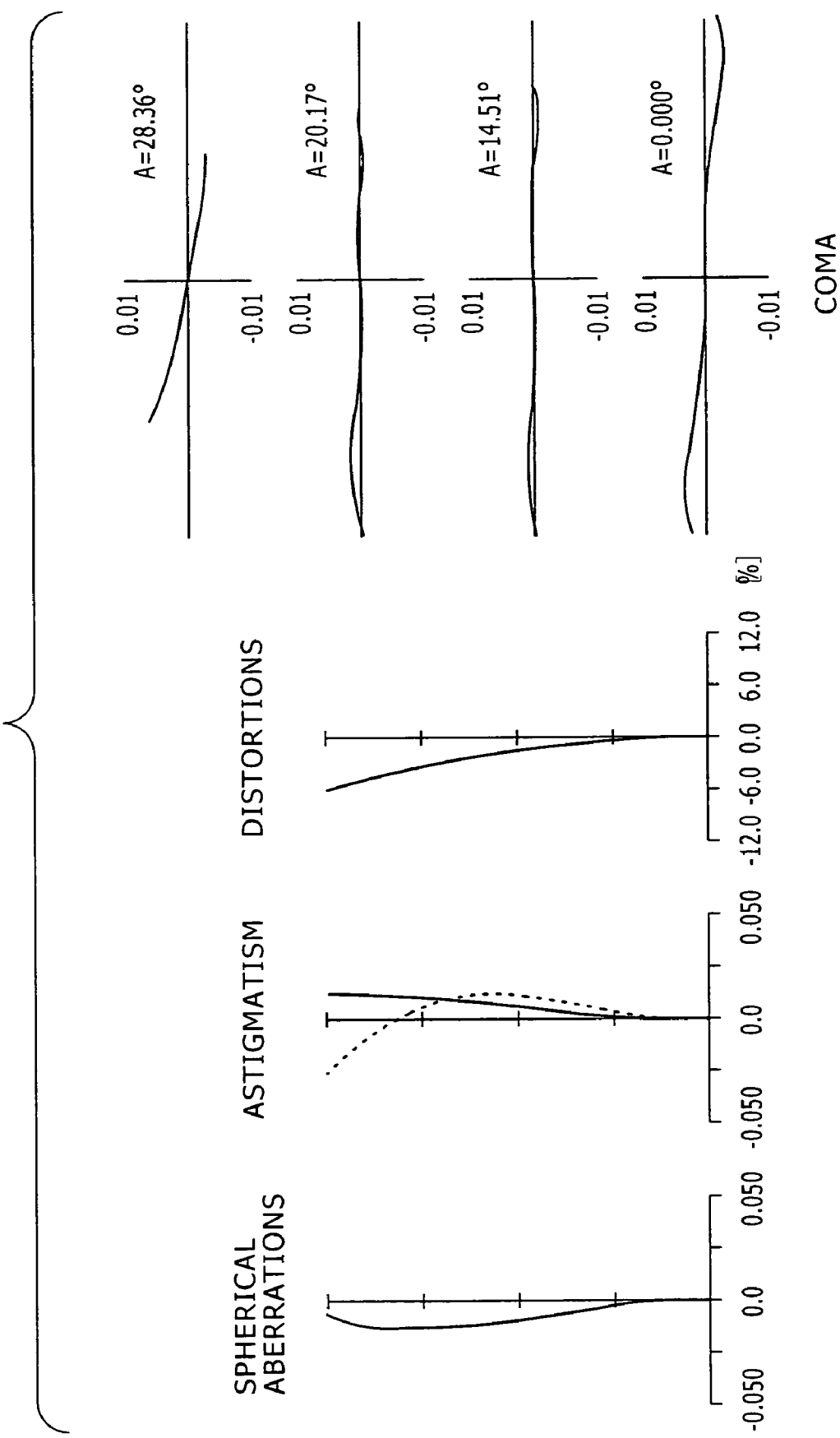
FIG. 3 shows, with FIGS. 4 to 8, respective aberration diagrams of a numerical example 1, created by adaptation of practical numerical values to the first embodiment of the present inventive zoom lens, the diagrams specifically showing spherical aberrations, astigmatism, distortions, and comatic aberrations or coma in a wide angle end mode.
Figure 4:
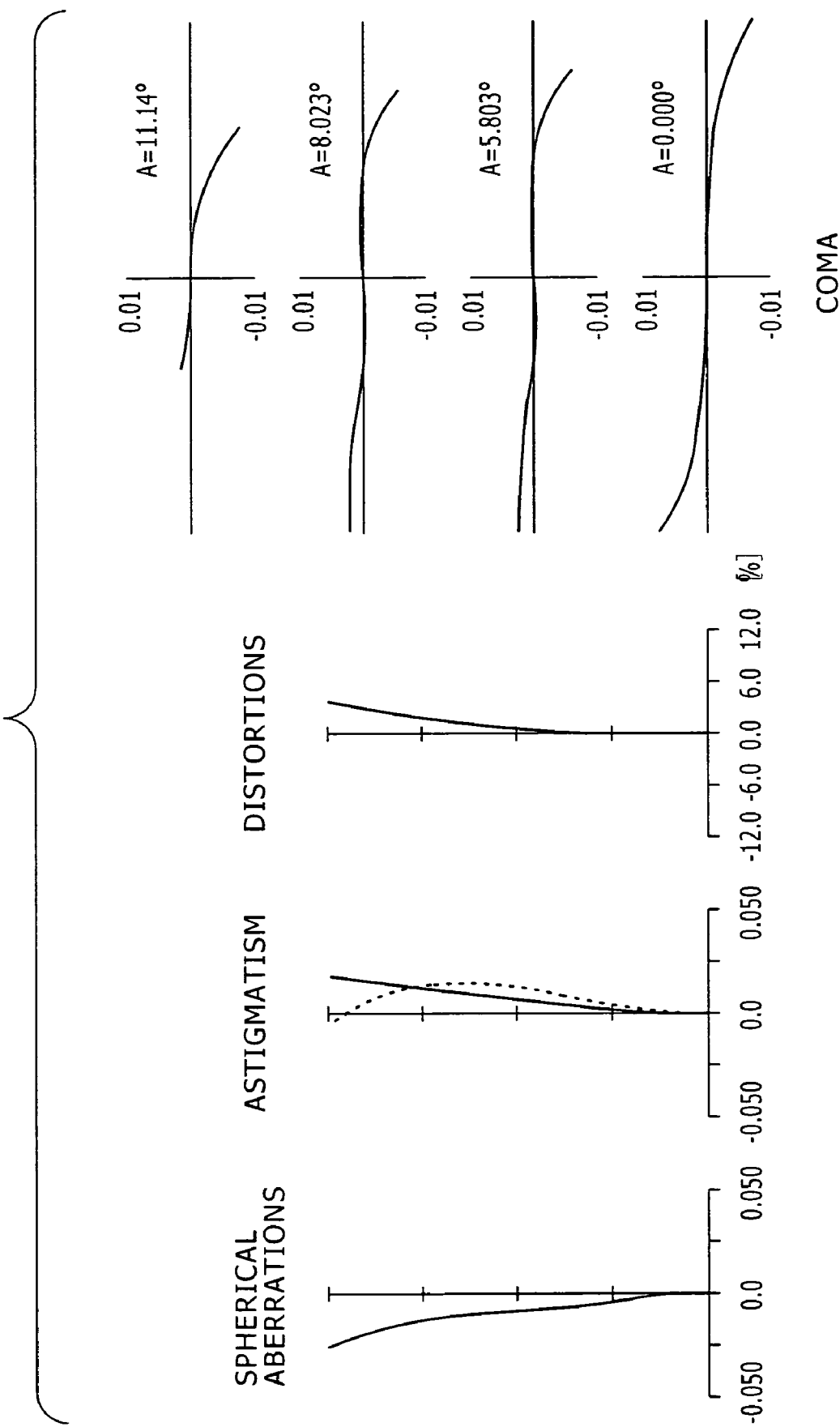
FIG. 4 shows spherical aberrations, astigmatism, distortions, and coma in an intermediate focal distance mode.
Figure 5:
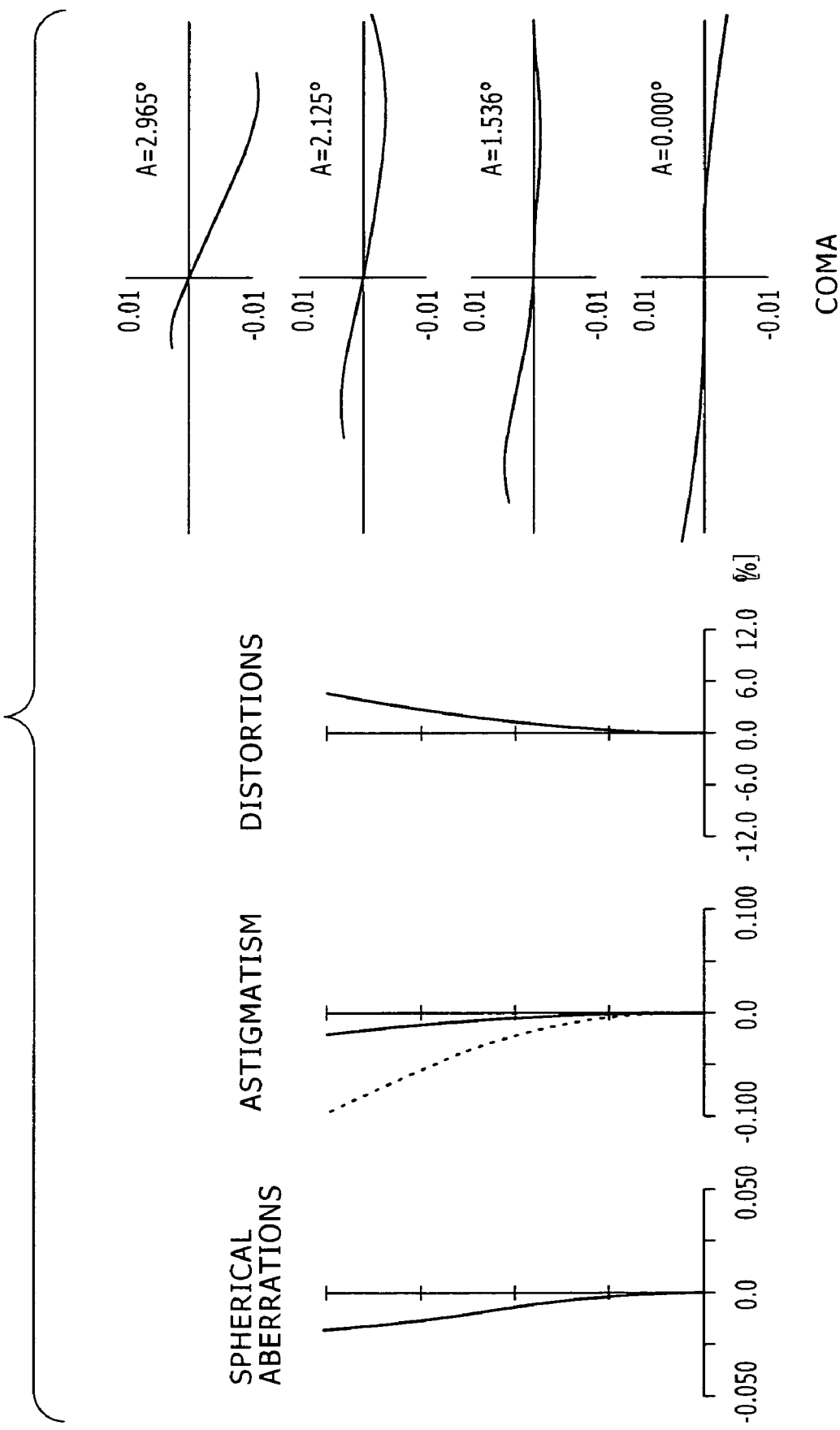
FIG. 5 shows spherical aberrations, astigmatism, distortions, and coma in a telephoto end mode.

FIGS. 3 to 5, respectively, show variable aberration diagrams in infinite focus modes in accordance with the numerical example 1. More specifically, FIG. 3 shows aberration diagrams in the wide angle end mode (f=2.940), FIG. 4 shows aberration diagrams in the intermediate focal distance mode (f=7.312), and FIG. 5 shows aberration diagrams in the telephoto end mode (f=27.628).

In the respective distortion diagrams of aberration diagrams of FIGS. 3 to 5, the solid line indicates the sagittal image surface, and the broken line indicates the meridional image surface. In the coma diagram, "A" denotes the angle of viewing.

Figure 6:
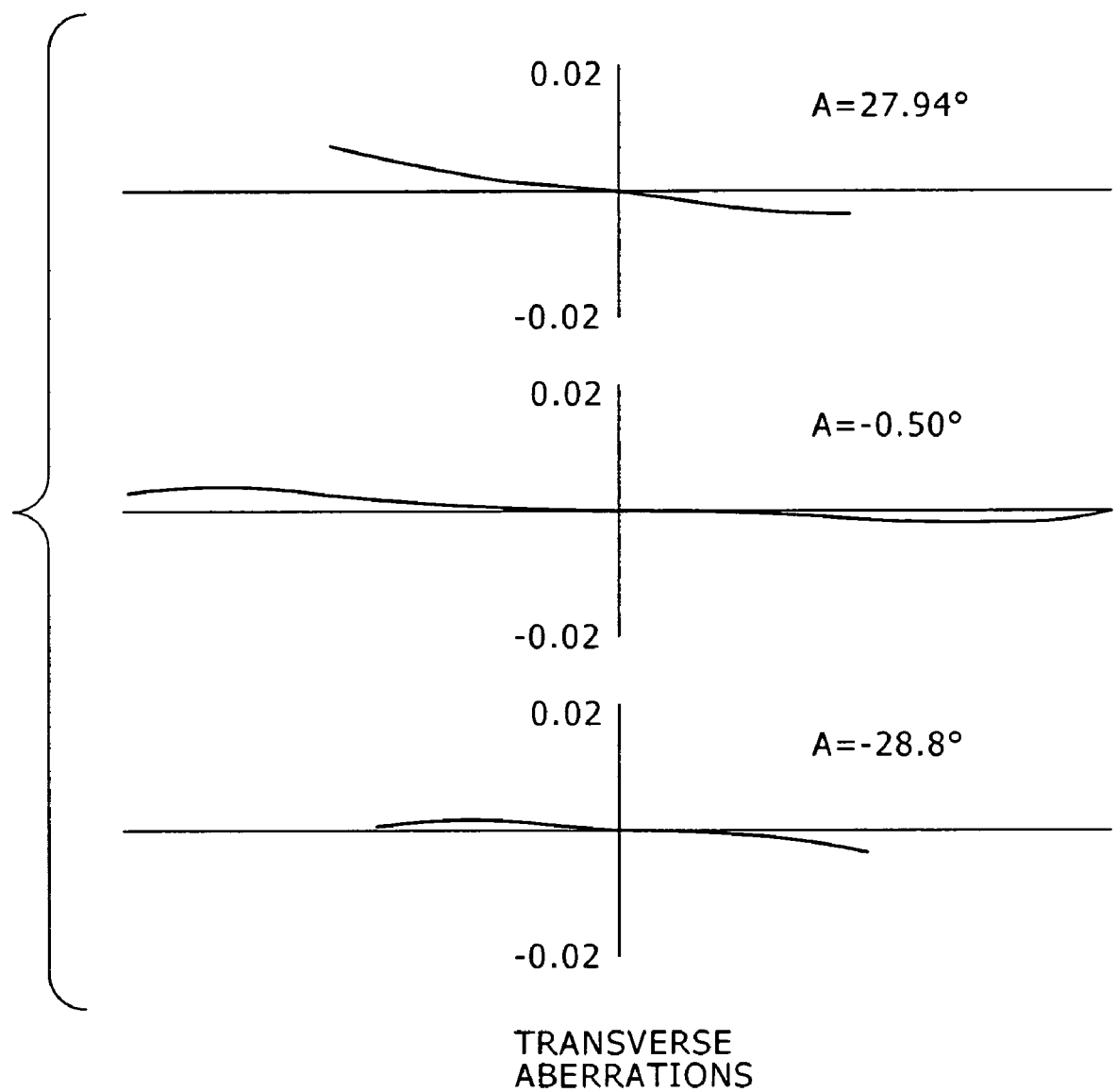
FIG. 6 shows transverse aberrations in the wide angle end mode.
Figure 7:
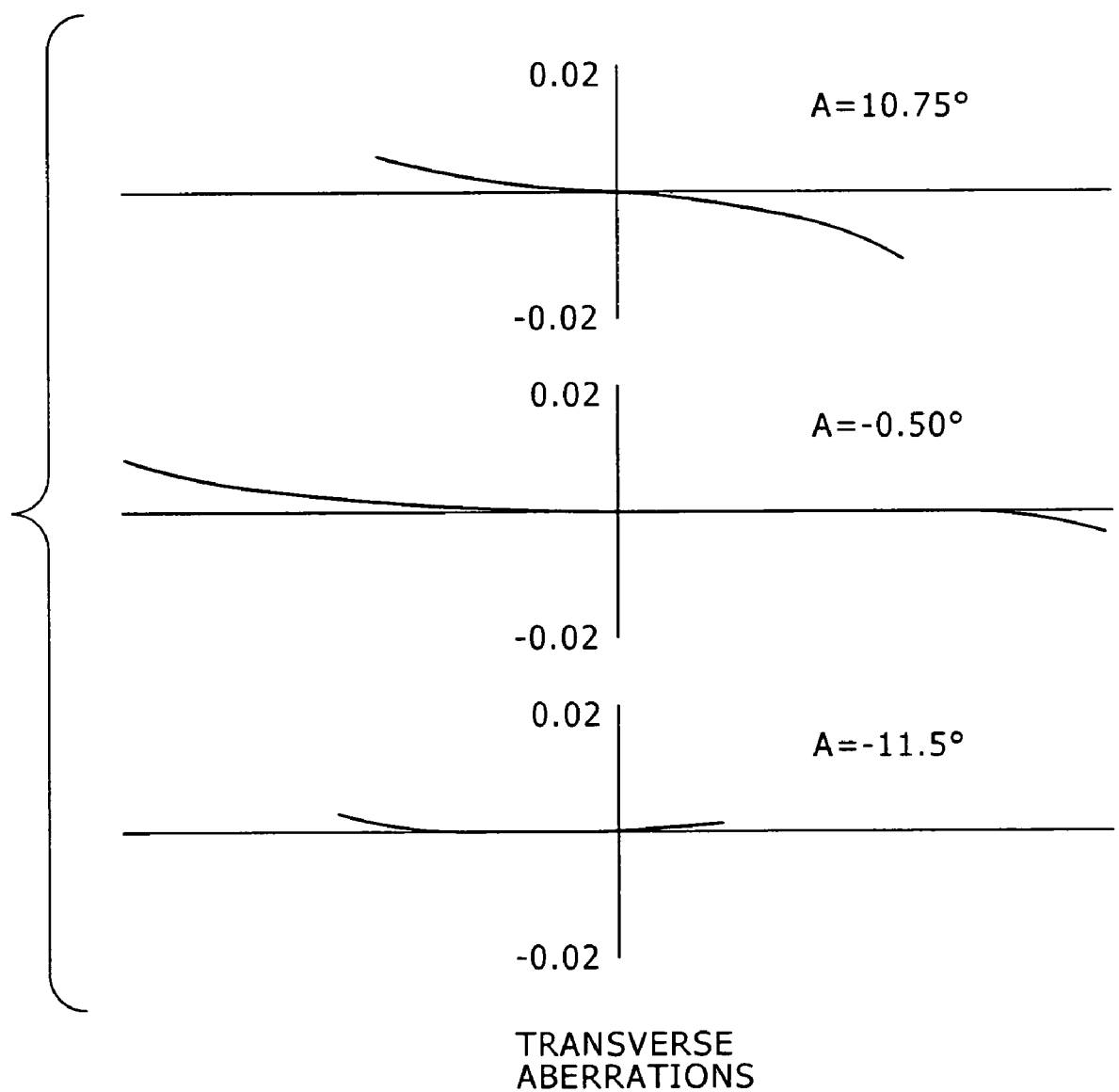
FIG. 7 shows transverse aberrations in the intermediate focal distance mode.
Figure 8:
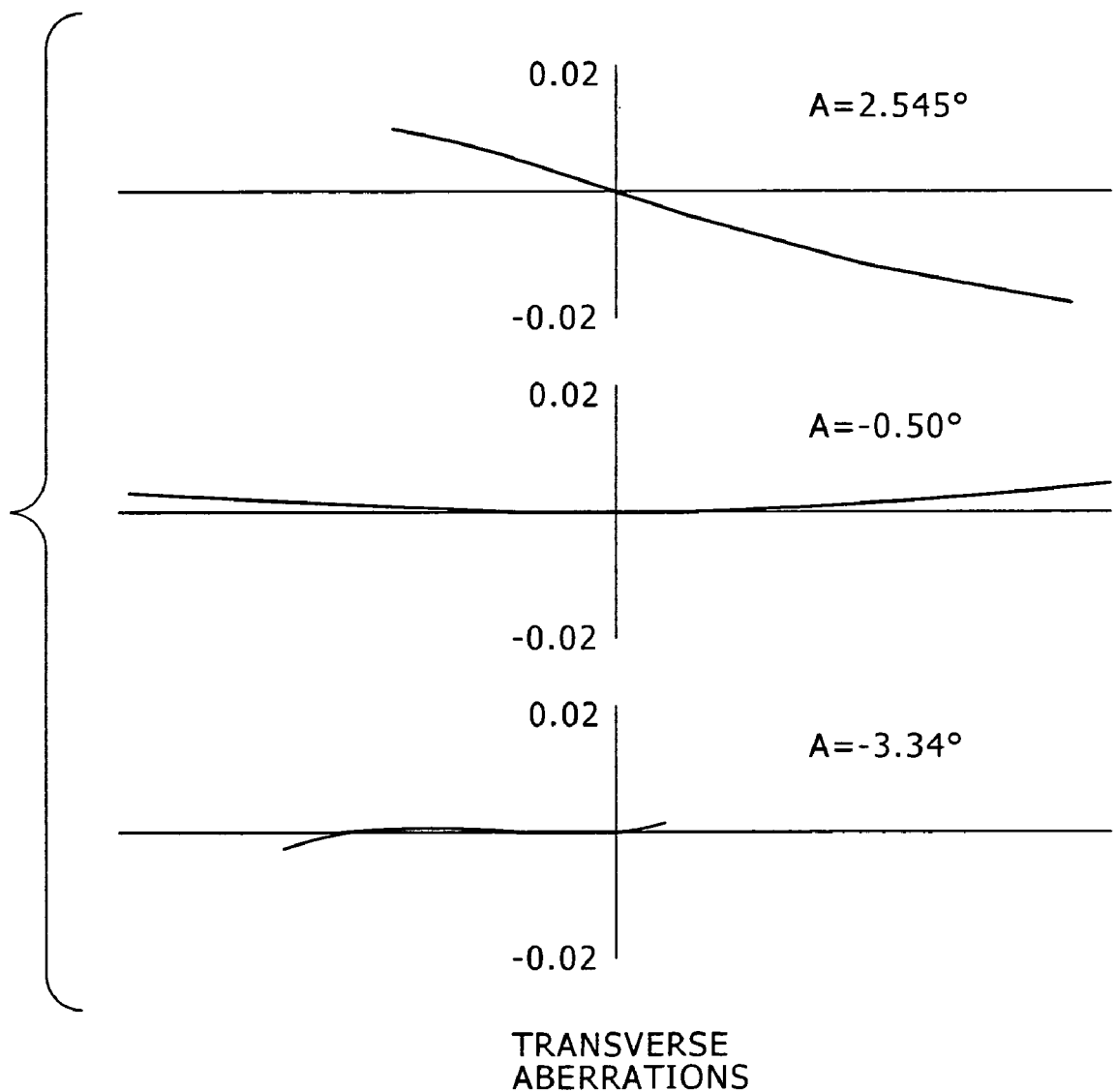
FIG. 8 shows transverse aberrations in the telephoto end mode.

FIGS. 6 to 8, respectively, show transverse aberration diagrams in the state of a lens shift of about 0.5 degrees in the infinite focus modes in accordance with the numerical example 1. In specific, FIG. 6 shows transverse aberration diagrams in the wide angle end mode (f=2.940), FIG. 7 shows transverse aberration diagrams in the intermediate focal distance mode (f=7.312), and FIG. 8 shows transverse aberration diagrams in the telephoto end mode (f=27.628).

Clearly from the respective aberration diagrams, aberrations are sufficiently compensated for in accordance with the numerical example 1, and excellent imaging performance is produced.

Figure 9:
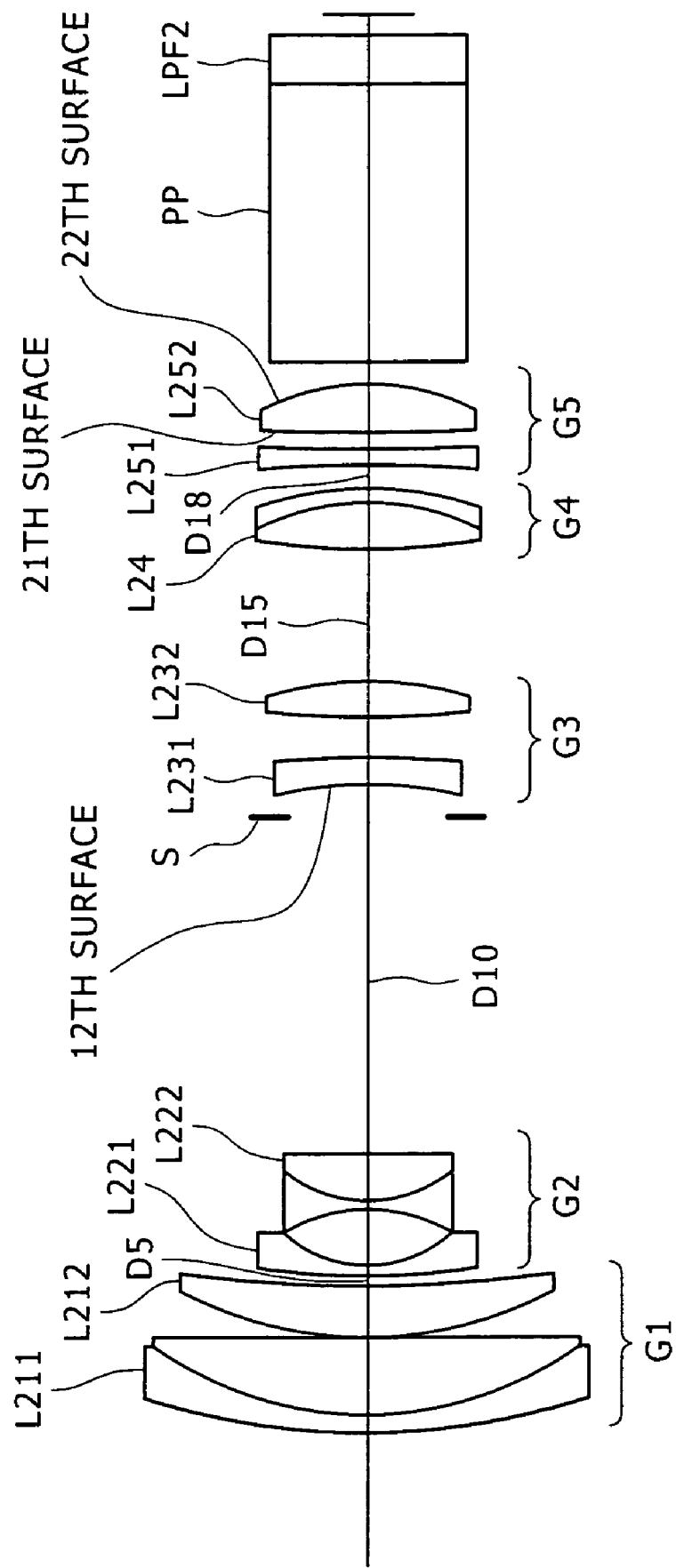
FIG. 9 is a view showing a lens configuration according to a second embodiment of the present inventive zoom lens.

FIG. 9 shows the lens configuration of a second embodiment of the present inventive zoom lens, in which a first lens group G1 is formed of a cemented lens L211 of a meniscus-shaped negative lens with the convex surface facing the object side, and a positive lens L212 with the convex surface facing the object side; a second lens group G2 is formed of a negative lens L221 with the concave surface facing the image side, and a cemented lens L222 of a both-side concave shaped negative lens and a positive lens with the convex surface facing the object side; a third lens group G3 is formed of a negative meniscus lens L231 and a both-side convex lens L232; a fourth lens group G4 is formed of a cemented positive lens L24 of a both-side convex lens and a meniscus-shaped negative lens with the concave surface facing the object side; and a fifth lens group G5 is formed of a both-side concave lens L251 and a both-side convex lens L252.

In the second embodiment, an aperture diaphragm S is disposed on the object side of the third lens group G3 and fixed during the shift in the lens position mode.

In the second embodiment, the both-side concave lens L251 disposed in the fifth lens group functions as a negative sub lens group, and the both-side convex lens L252 functions as a positive sub lens group, in which the image can be shifted by the shift of the both-side convex lens L252 along the direction perpendicular to the optical axis. In addition, a prism PP and a low pass filter LPF2 are disposed on the image side of the fifth lens group G5.

Table 5 shows various values in a numerical example 2 in the event that practical numerical values are adapted to the second embodiment.

TABLE 5 f 2.94~7.31~27.6
F NO 1.75~1.98~2.40
2ω 56.72~22.59~5.99°

| Surface No. | Radius of Curvature | Inter-surface Distance | Refraction Index | Abbe's Number |
|---|---|---|---|---|
| 1: | 30.3357 | 0.700 | 1.84666 | 23.8 |
| 2: | 14.8545 | 3.070 | 1.69680 | 55.3 |
| 3: | −310.2570 | 0.100 | | |
| 4: | 16.3110 | 1.900 | 1.75500 | 52.3 |
| 5: | 48.4268 | (D5) | | |
| 6: | 26.6368 | 0.400 | 1.88300 | 40.8 |
| 7: | 5.3926 | 2.250 | | |
| 8: | −6.8120 | 0.400 | 1.83500 | 43.0 |
| 9: | 5.4927 | 1.750 | 1.92286 | 20.9 |
| 10: | −123.8628 | (D10) | | |
| 11: | 0.0000 | 1.430 | (Aperture Diaphragm) | |
| 12: | −20.1104 | 1.000 | 1.69350 | 53.2 |
| 13: | −32.5214 | 1.650 | | |
| 14: | 29.0170 | 1.450 | 1.48749 | 70.4 |
| 15: | −14.7718 | (D15) | | |
| 16: | 27.2370 | 1.900 | 1.60300 | 65.5 |
| 17: | −9.7700 | 0.400 | 1.92286 | 20.9 |
| 18: | −14.5822 | (D18) | | |
| 19: | −52.7915 | 0.600 | 1.88300 | 40.8 |
| 20: | 100.0000 | 0.800 | | |
| 21: | 42.3276 | 1.850 | 1.48749 | 70.4 |
| 22: | −9.2283 | 1.000 | | |
| 23: | 0.0000 | 11.000 | 1.58913 | 61.3 |
| 24: | 0.0000 | 1.900 | 1.51680 | 64.2 |
| 25: | 0.0000 | (Bf) | | |

The respective lens surfaces corresponding to the 12th, 21st, and 22nd surfaces are formed of aspheric surfaces, and the aspheric surface coefficients thereof are shown in Table 6.

TABLE 6

[12th Surface]

$\kappa = +0.000$    $C_4 = -0.23700 \times 10^{-3}$    $C_6 = -0.11404 \times 10^{-4}$
$C_8 = +0.77423 \times 10^{-6}$    $C_{10} = -0.34115 \times 10^{-7}$

[21st Surface]

$\kappa = +0.000$    $C_4 = -0.29538 \times 10^{-3}$    $C_6 = -0.75249 \times 10^{-5}$
$C_8 = -0.11808 \times 10^{-5}$    $C_{10} = +0.31175 \times 10^{-7}$

[22nd Surface]

$\kappa = +0.000$    $C_4 = +0.25661 \times 10^{-3}$    $C_6 = -0.19920 \times 10^{-4}$
$C_8 = +0.00000$    $C_{10} = +0.00000$ In conjunction with the shift of the lens position mode from the wide angle end mode to the telephoto end mode, there are varied an inter-surface distance D5 between the first and second lens groups G1 and G2, an inter-surface distance D10 between the second lens group G2 and the aperture diaphragm S, an inter-surface distance D15 between the third and fourth lens groups G3 and G4, and an inter-surface distance D18 between the fourth and fifth lens groups G4 and G5. Table 7 shows, together with focal distances f, values of the respective inter-surface distances in the wide angle end mode, intermediate focal distance mode between the wide angle end position and the telephoto end position, and the telephoto end mode.

TABLE 7

(Table of Variable Distances)

| | f | | |
|---|---|---|---|
| | 2.941 | 7.312 | 27.615 |
| D5 | 0.420 | 5.849 | 11.231 |
| D10 | 13.351 | 7.922 | 2.540 |
| D15 | 5.392 | 2.262 | 5.349 |
| D18 | 0.987 | 4.117 | 1.031 |
| Bf | 0.809 | 0.809 | 0.809 |

Table 8 shows corresponding values to the conditional equations (1), (2), (3), and (4) in accordance with the numerical example 2.

TABLE 8 f5n = −13.171
f5p = +11.947

(1) f5p/Da = 0.812
(2) f5p/Db = 0.765
(3) |f5n|/ft = 0.477
(4) C5p · ft = −2.992

Figure 10:
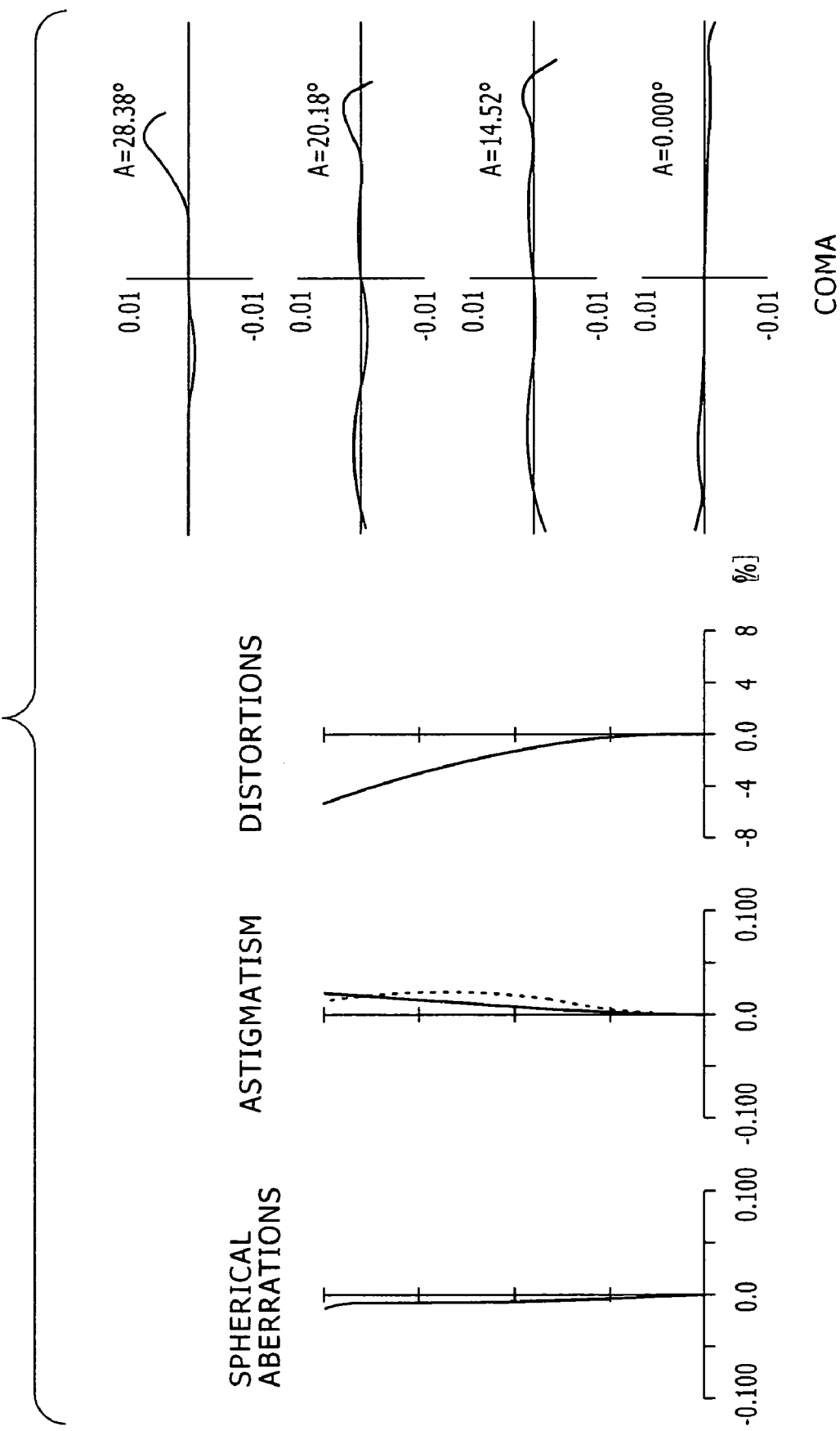
FIG. 10 shows, with FIGS. 11 to 15, respective aberration diagrams of a numerical example 2, created by adaptation of practical numerical values to the second embodiment of the present inventive zoom lens, the diagrams specifically showing spherical aberrations, astigmatism, distortions, and coma in a wide angle end mode.
Figure 11:
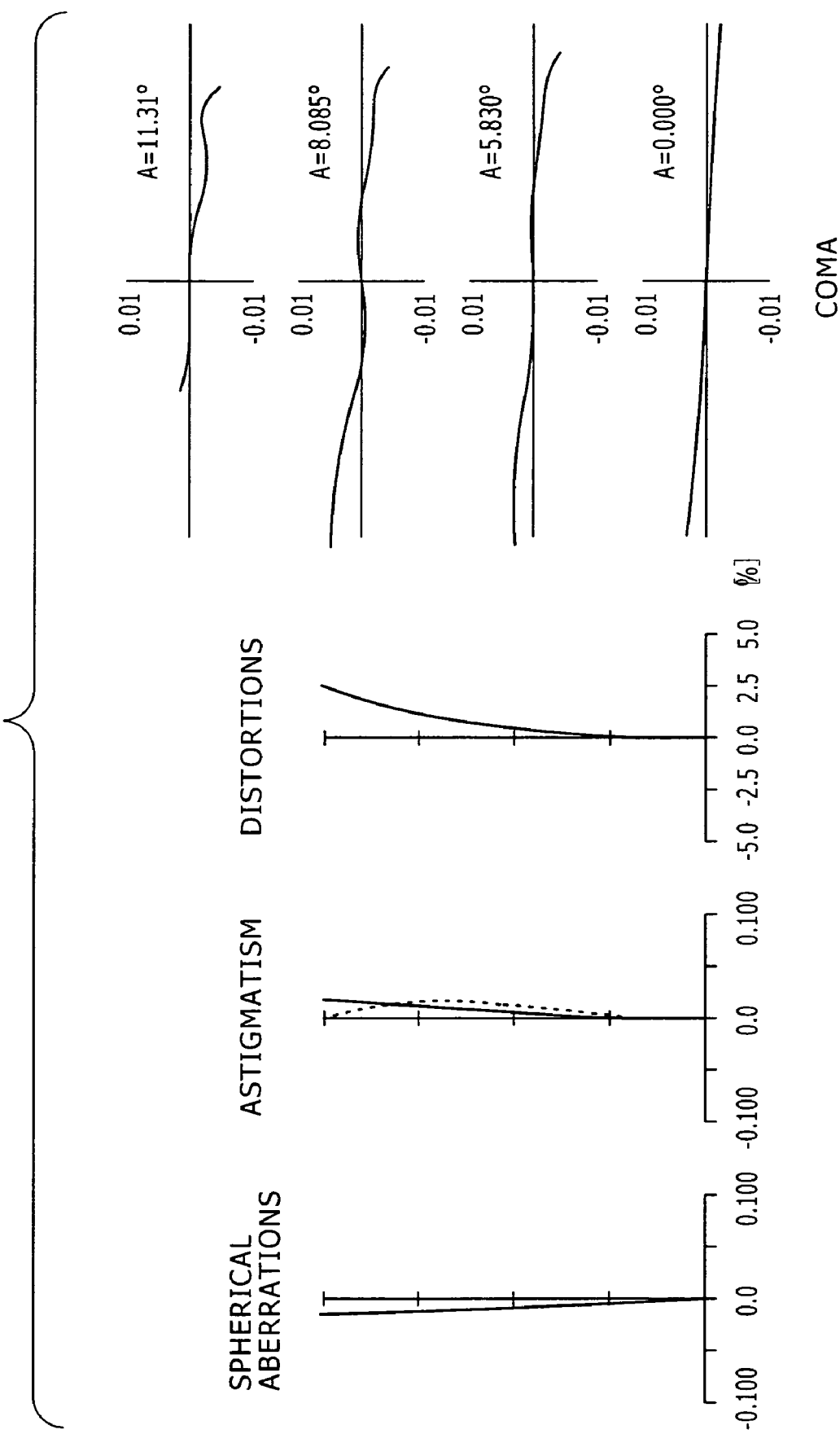
FIG. 11 shows spherical aberrations, astigmatism, distortions, and coma in an intermediate focal distance mode.
Figure 12:
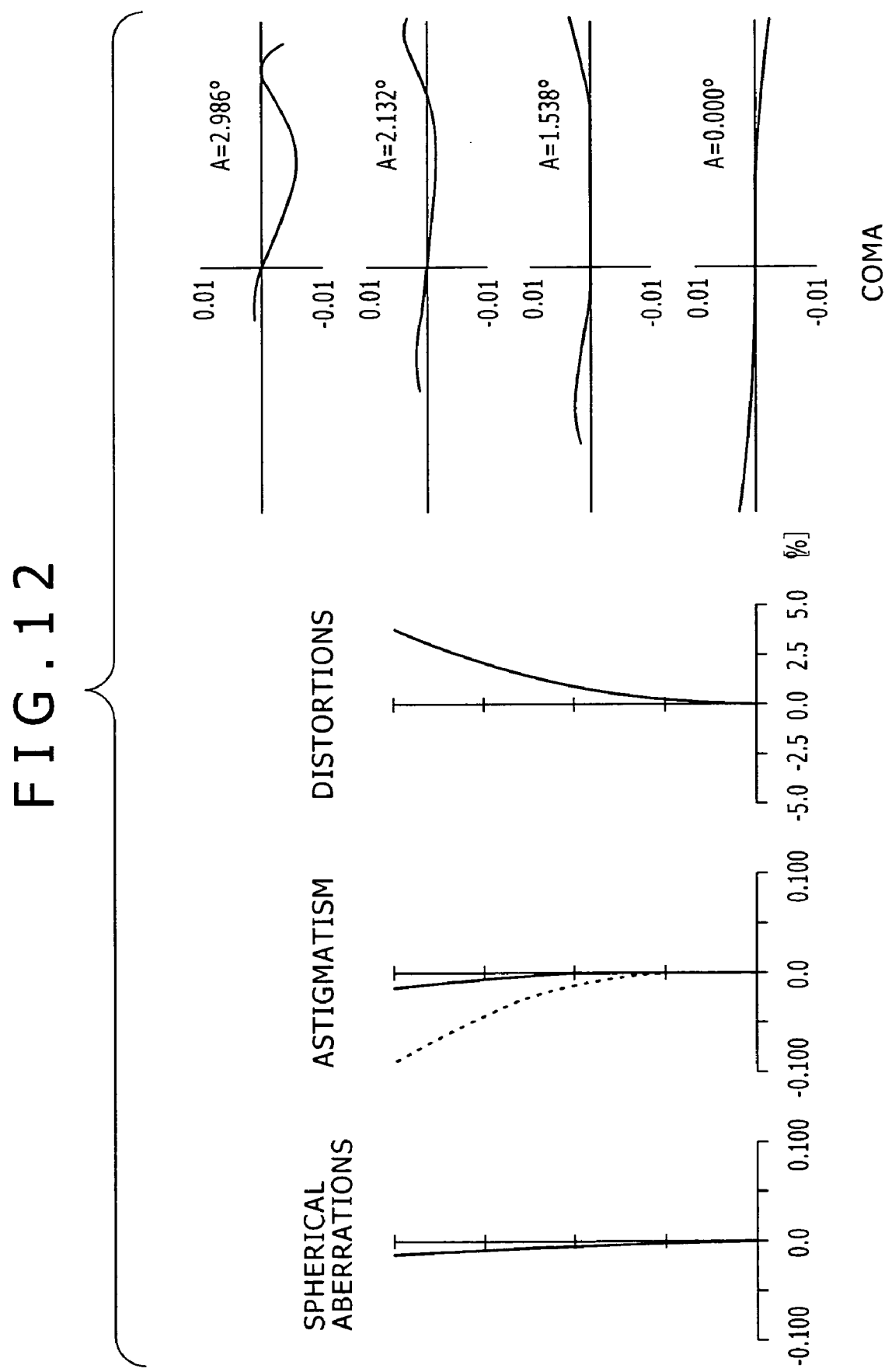
FIG. 12 shows spherical aberrations, astigmatism, distortions, and coma in a telephoto end mode.

FIGS. 10 to 12, respectively, show variable aberration diagrams in infinite focus modes in accordance with the numerical example 2. FIG. 10 shows aberration diagrams in the wide angle end mode (f=2.941), FIG. 11 shows aberration diagrams in the intermediate focal distance mode (f=7.312), and FIG. 12 shows aberration diagrams in the telephoto end mode (f=27.615).

In the respective distortion diagrams of aberration diagrams of FIGS. 10 to 12, the solid line indicates the sagittal image surface, and the broken line indicates the meridional image surface. In the coma diagram, "A" denotes the angle of viewing.

Figure 13:
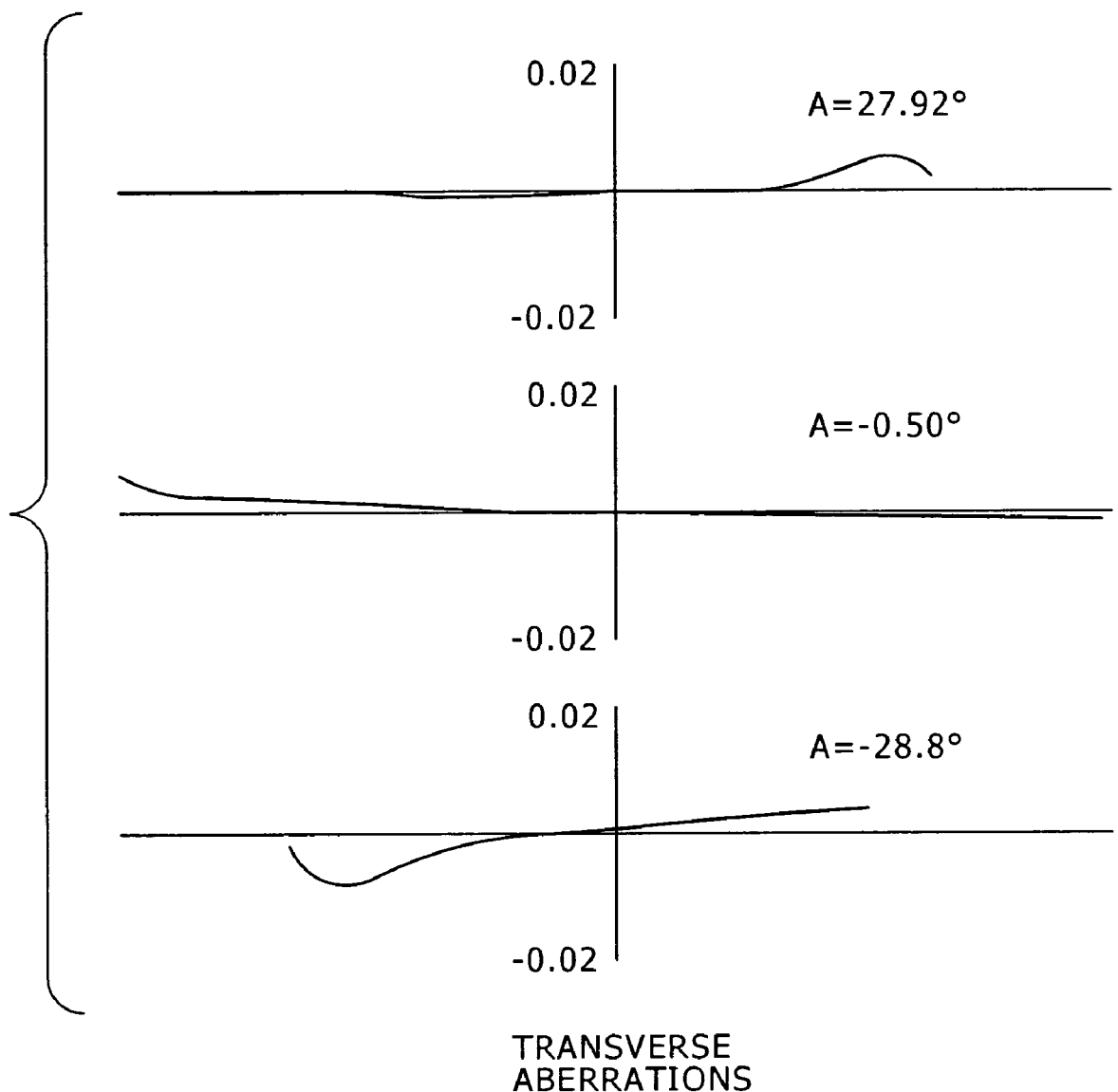
FIG. 13 shows transverse aberrations in the wide angle end mode.
Figure 14:
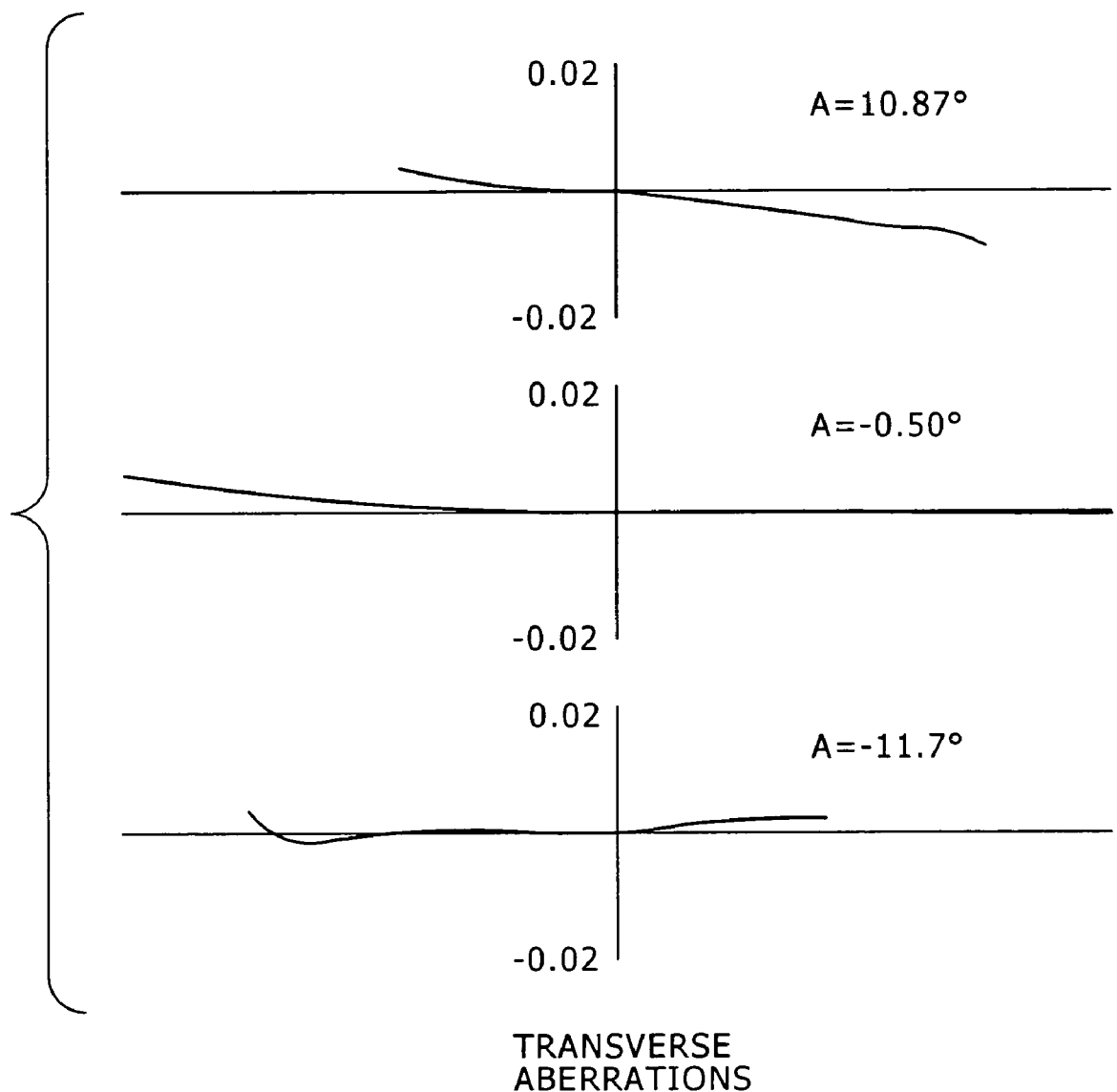
FIG. 14 shows transverse aberrations in the intermediate focal distance mode.
Figure 15:
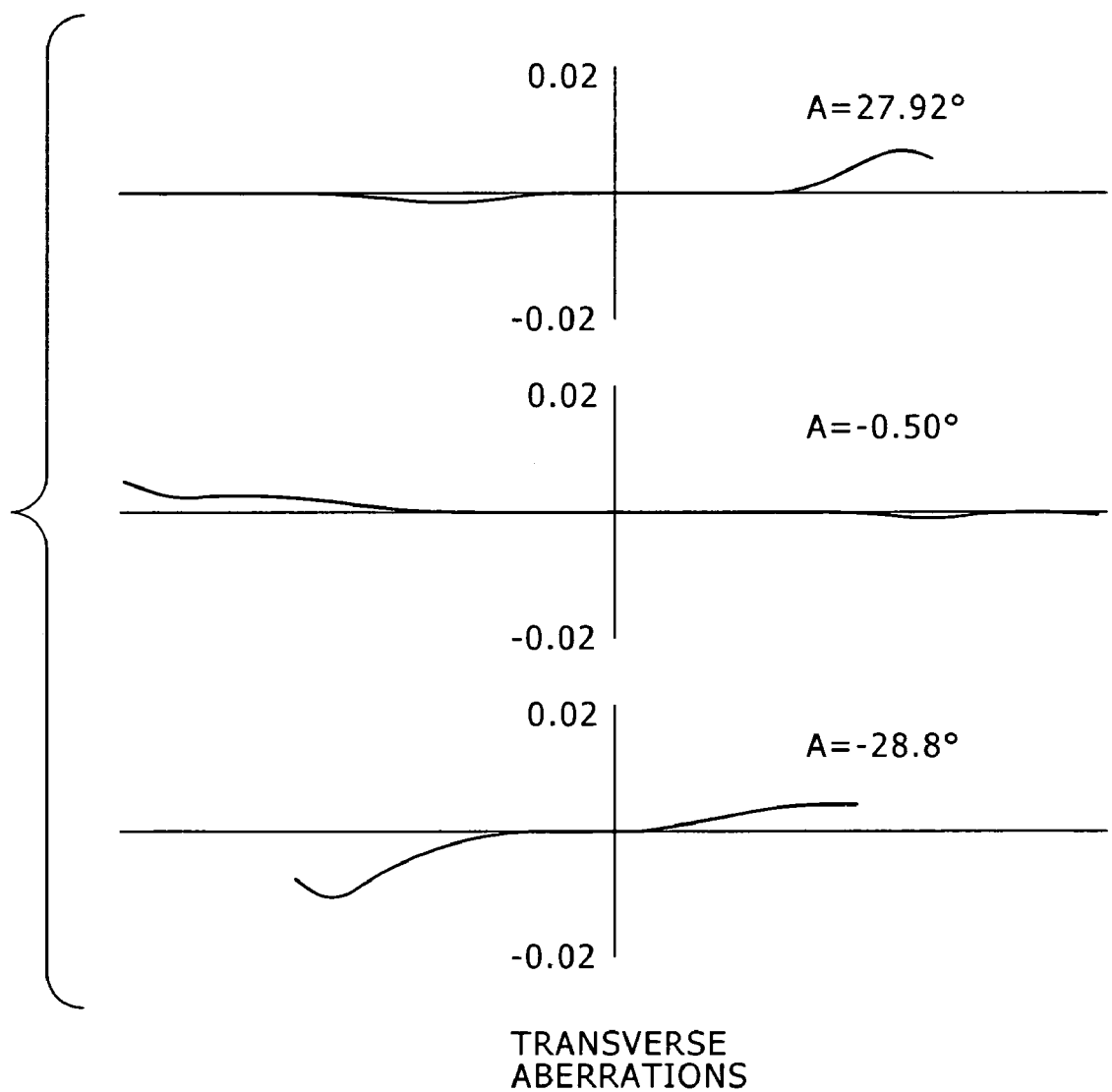
FIG. 15 shows transverse aberrations in the telephoto end mode.

FIGS. 13 to 15, respectively, show transverse aberration diagrams in the state of a lens shift of about 0.5 degrees in the infinite focus modes in accordance with the numerical example 2, FIG. 13 shows aberration diagrams in the wide angle end mode (f=2.941), FIG. 14 shows aberration diagrams in the intermediate focal distance mode (f=7.312), and FIG. 15 shows aberration diagrams in the telephoto end mode (f=27.615).

Clearly from the respective aberration diagrams, aberrations are sufficiently compensated for in accordance with the numerical example 1, and excellent imaging performance is produced.

Figure 16:
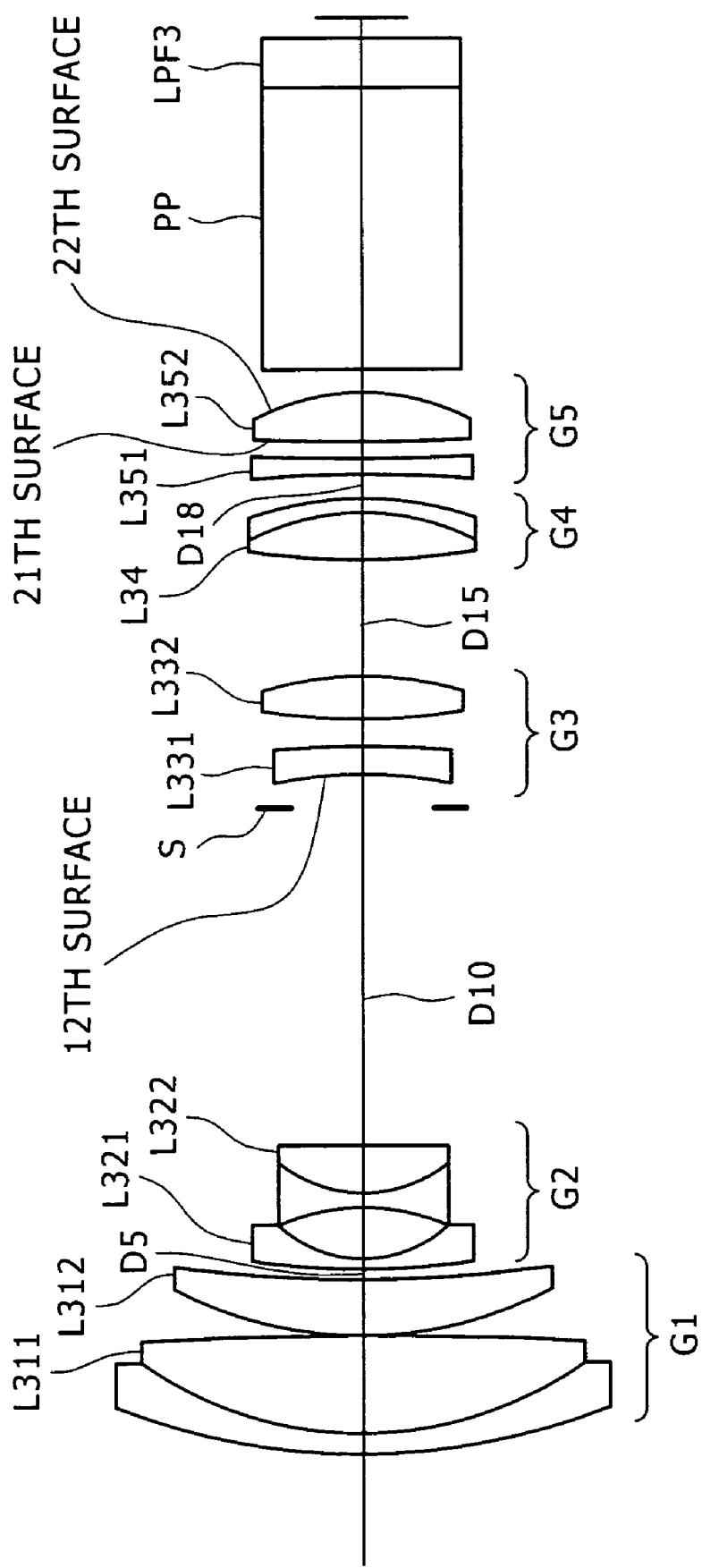
FIG. 16 is a view showing a lens configuration according to a third embodiment of the present inventive zoom lens.

FIG. 16 shows the lens configuration of a third embodiment of the present inventive zoom lens, in which a first lens group G1 is formed of a cemented lens L311 of a meniscus-shaped negative lens with the convex surface facing the object side, and a positive lens L312 with the convex surface facing the object side; a second lens group G2 is formed of a negative lens L321 with the concave surface facing the image side, and a cemented lens L322 of a both-side concave shaped negative lens and a positive lens with the convex surface facing the object side; a third lens group G3 is formed of a negative meniscus lens L331 and a both-side convex lens L332; a fourth lens group G4 is formed of a cemented positive lens L34 of a both-side convex lens and a meniscus-shaped negative lens with the concave surface facing the object side; and a fifth lens group G5 is formed of a both-side concave lens L351 and a both-side convex lens L352.

In the third embodiment, an aperture diaphragm S is disposed on the object side of the third lens group G3 and fixed during the shift in the lens position mode.

In the third embodiment, the negative lens L351 disposed in the fifth lens group functions as a negative sub lens group, and the both-side convex lens L352 functions as a positive sub lens group, in which the image can be shifted by the shift of the both-side convex lens L352 along the direction perpendicular to the optical axis. In addition, a prism PP and a low pass filter LPF3 are disposed on the image side of the fifth lens group G5.

Table 9 shows various values in a numericalal example 3 in the event that practical numericalal values are adapted to the third embodiment.

TABLE 9 f 2.94~7.31~27.6
F NO 1.75~1.97~2.31
2ω 56.72~22.46~5.94°

| Surface No. | Radius of Curvature | Inter-surface Distance | Refraction Index | Abbe's Number |
|---|---|---|---|---|
| 1: | 29.3835 | 0.700 | 1.84666 | 23.8 |
| 2: | 15.0400 | 3.800 | 1.69680 | 55.3 |
| 3: | −199.9795 | 0.100 | | |
| 4: | 17.1421 | 2.250 | 1.75500 | 53.3 |
| 5: | 44.1766 | (D5) | | |
| 6: | 32.1142 | 0.400 | 1.88300 | 40.8 |
| 7: | 5.6901 | 2.070 | | |
| 8: | −7.0860 | 0.400 | 1.83500 | 43.0 |
| 9: | 5.2586 | 1.830 | 1.92286 | 20.9 |
| 10 | 0.0000 | (D10) | | |
| 11: | 0.0000 | 1.430 | (Aperture Diaphragm) | |
| 12: | −20.0000 | 1.000 | 1.69350 | 53.3 |
| 13: | −63.9524 | 1.180 | | |
| 14: | 26.2395 | 1.660 | 1.48749 | 70.4 |
| 15: | −13.0529 | (D15) | | |
| 16: | 21.6861 | 2.040 | 1.62041 | 60.3 |
| 17: | −9.1741 | 0.400 | 1.92286 | 20.9 |
| 18: | −14.0265 | (D18) | | |
| 19: | −40.1627 | 0.600 | 1.88300 | 40.8 |
| 20: | 100.0000 | 0.800 | | |
| 21: | −183.8033 | 1.720 | 1.58913 | 61.3 |
| 22: | −8.6252 | 1.000 | | |
| 23: | 0.0000 | 11.000 | 1.58913 | 61.3 |
| 24: | 0.0000 | 1.900 | 1.51680 | 64.2 |
| 25: | 0.0000 | (Bf) | | |

The respective lens surfaces corresponding to the 12th, 21st, and 22nd surfaces are formed of aspheric surfaces, and the aspheric surface coefficients thereof are shown in Table 10.

TABLE 10

[12th Surface]

$\kappa = +0.000$    $C_4 = -0.32050 \times 10^{-3}$    $C_6 = -0.10580 \times 10^{-4}$
$C_8 = +0.37615 \times 10^{-6}$    $C_{10} = -0.16632 \times 10^{-7}$

[21st Surface]

$\kappa = +0.000$    $C_4 = -0.36738 \times 10^{-3}$    $C_6 = -0.94788 \times 10^{-5}$
$C_8 = -0.13654 \times 10^{-5}$    $C_{10} = +0.38979 \times 10^{-7}$

[22nd Surface]

$\kappa = +0.000$    $C_4 = +0.21270 \times 10^{-3}$    $C_6 = -0.21110 \times 10^{-4}$
$C_8 = +0.00000$    $C_{10} = +0.00000$ In conjunction with the shift of the lens position mode from the wide angle end mode to the telephoto end mode, there are varied an inter-surface distance D5 between the first and second lens groups G1 and G2, an inter-surface distance D10 between the second lens group G2 and the aperture diaphragm S, an inter-surface distance D15 between the third and fourth lens groups G3 and G4, and an inter-surface distance D18 between the fourth and fifth lens groups G4 and G5. Table 11 shows, together with focal distances f, values of the respective inter-surface distances in the wide angle end mode, intermediate focal distance mode between the wide angle end position and the telephoto end position, and the telephoto end mode.

TABLE 11

(Table of Variable Distances)

| | f | | |
|---|---|---|---|
| | 2.942 | 7.313 | 27.617 |
| D5 | 0.420 | 5.856 | 11.256 |
| D10 | 13.376 | 7.940 | 2.540 |
| D15 | 4.636 | 2.058 | 4.595 |
| D18 | 0.988 | 3.566 | 1.029 |
| Bf | 0.811 | 0.811 | 0.811 |

Table 12 shows corresponding values to the conditional equations (1), (2), (3), and (4) in accordance with the numerical example 3.

TABLE 12

Figure 17:
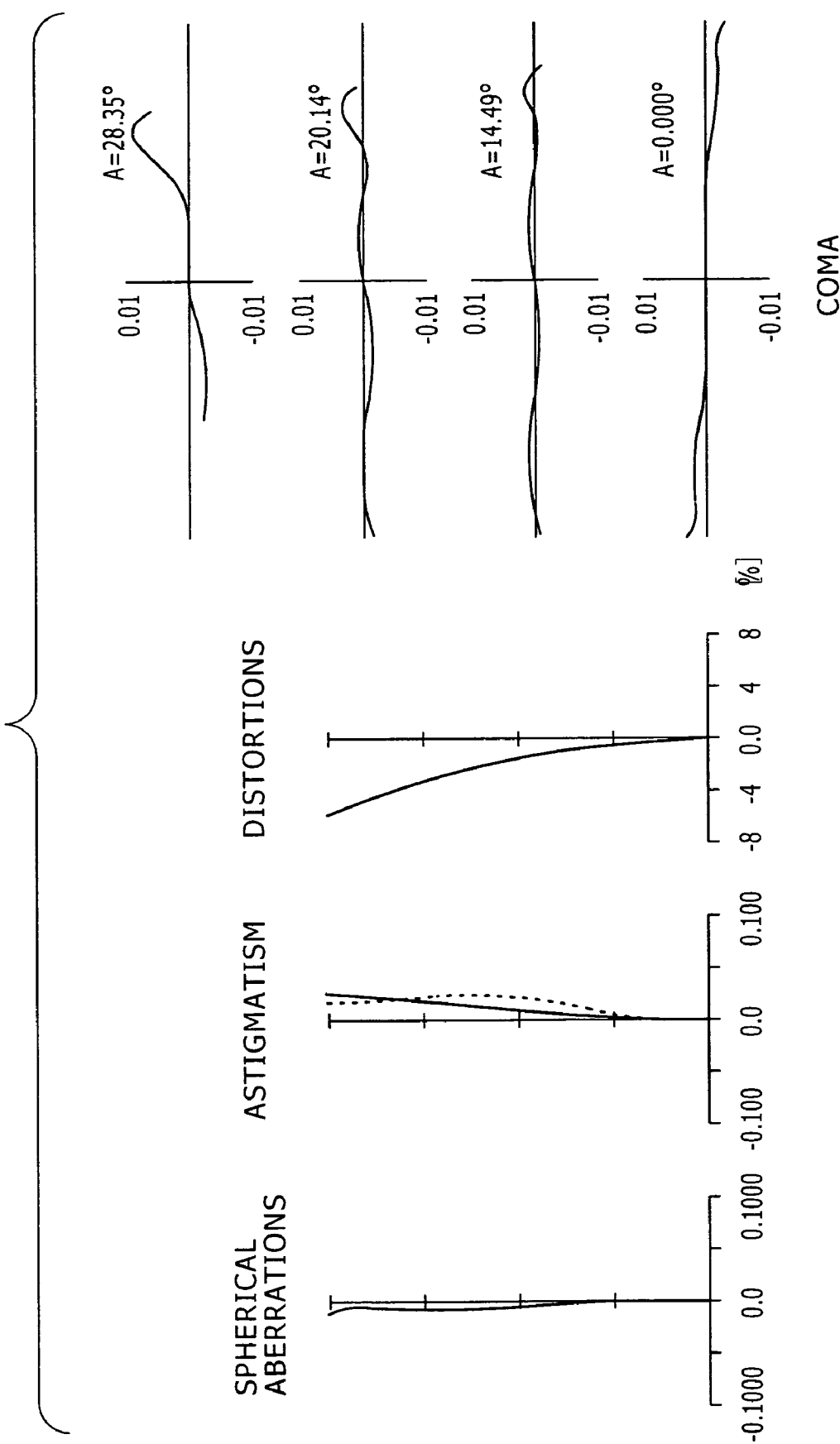
FIG. 17 shows, with FIGS. 18 to 22, respective aberration diagrams of a numerical example 3, created by adaptation of practical numerical values to the third embodiment of the present inventive zoom lens, the diagrams specifically showing spherical aberrations, astigmatism, distortions, and coma in a wide angle end mode.
Figure 18:
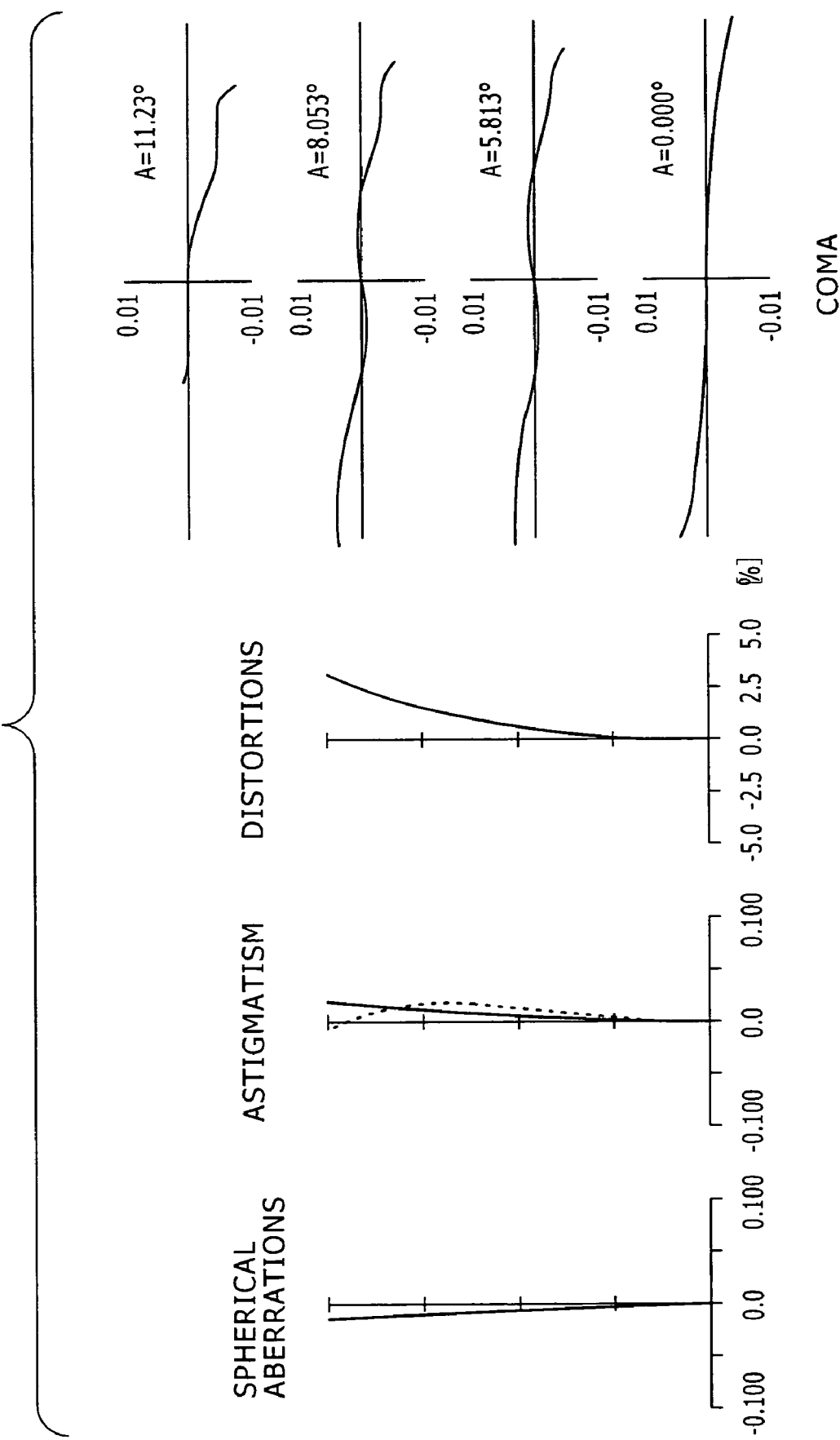
FIG. 18 shows spherical aberrations, astigmatism, distortions, and coma in an intermediate focal distance mode.
Figure 19:
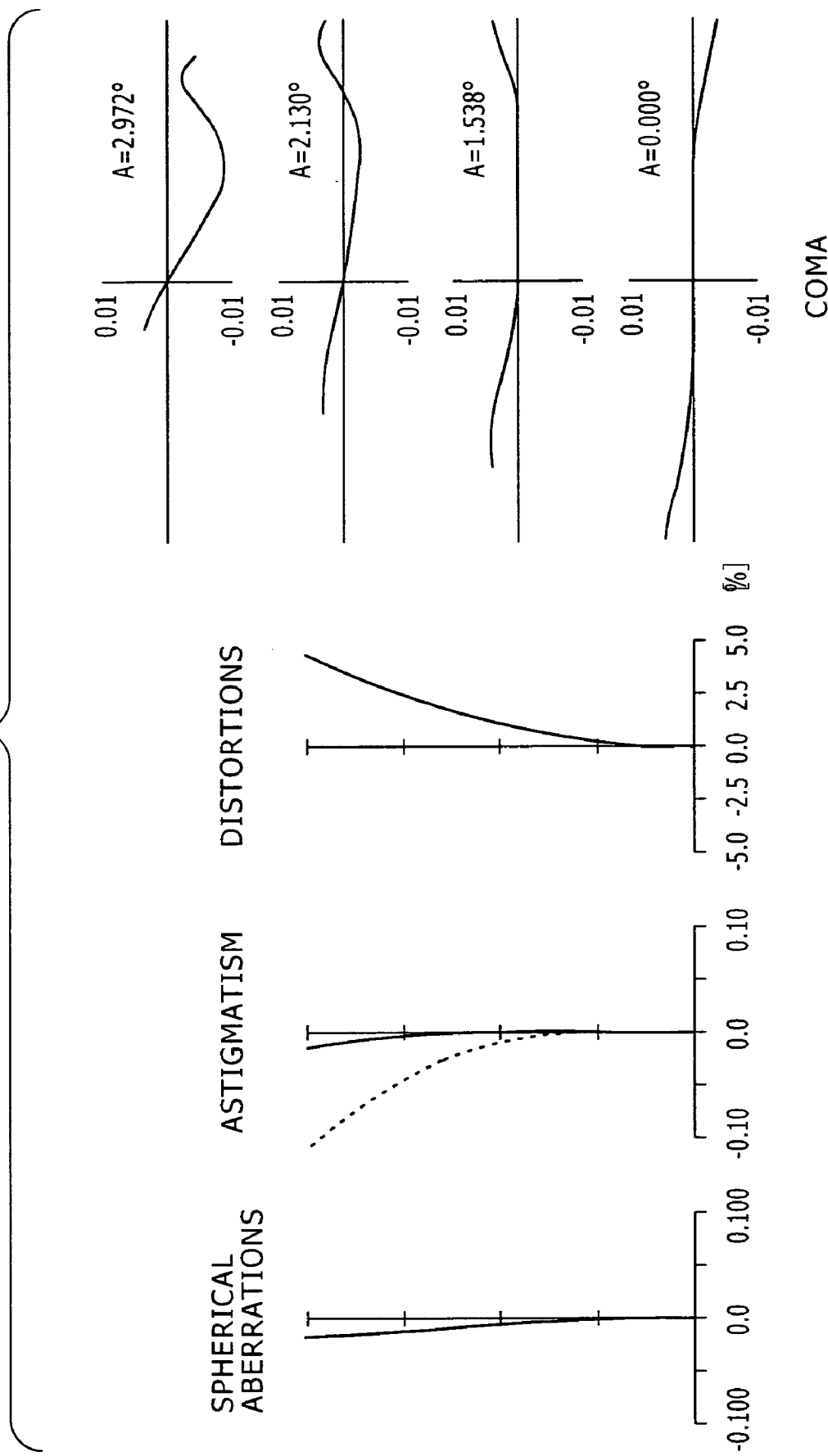
FIG. 19 shows spherical aberrations, astigmatism, distortions, and coma in a telephoto end mode.

$f5n = -20.092$
$f5p = +14.994$ (1) $f5p/Da = 1.019$
(2) $f5p/Db = 1.017$
(3) $|f5n|/ft = 0.728$
(4) $C5p \cdot ft = -3.202$ FIGS. 17 to 19, respectively, show variable aberration diagrams in infinite focus modes in accordance with the numerical example 3. More specifically, FIG. 17 shows aberration diagrams in the wide angle end mode (f=2.942), FIG. 18 shows aberration diagrams in the intermediate focal distance mode (f=7.313), and FIG. 19 shows aberration diagrams in the telephoto end mode (f=27.617).

In the respective distortion diagrams of aberration diagrams of FIGS. 17 to 19, the solid line indicates the sagittal image surface, and the broken line indicates the meridional image surface. In the coma diagram, "A" denotes the angle of viewing.

Figure 20:
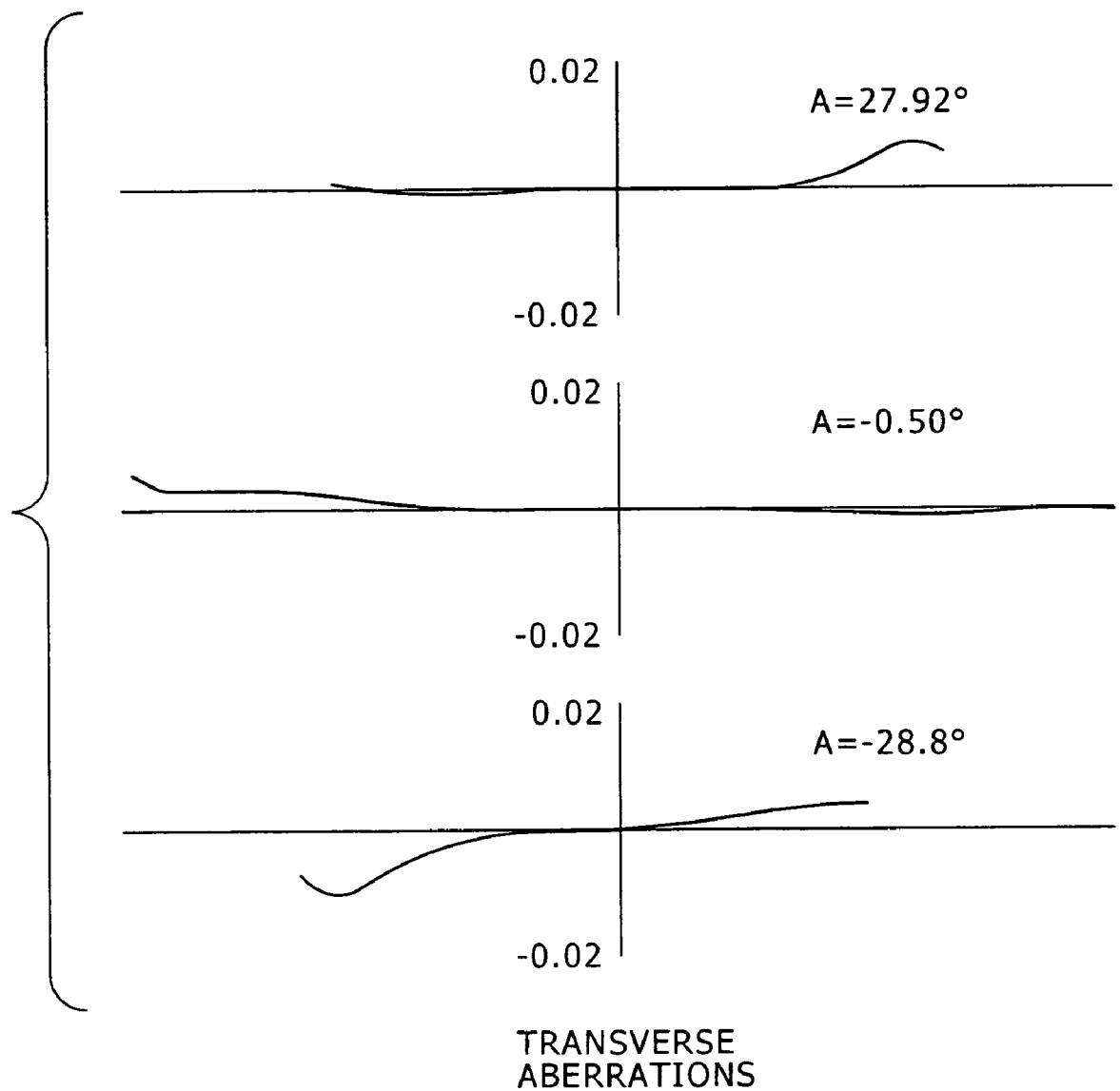
FIG. 20 shows transverse aberrations in the wide angle end mode.
Figure 21:
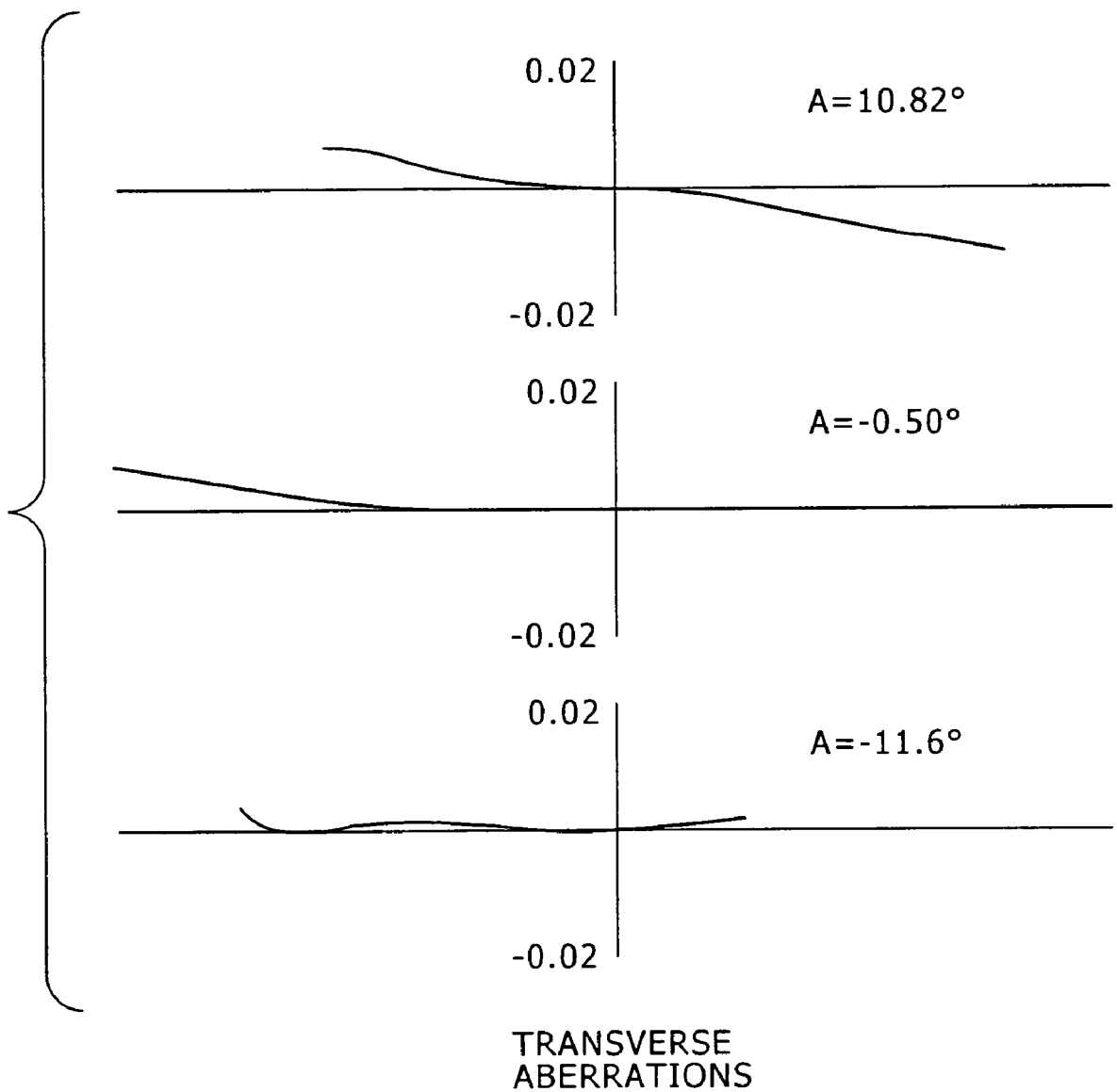
FIG. 21 shows transverse aberrations in the intermediate focal distance mode.
Figure 22:
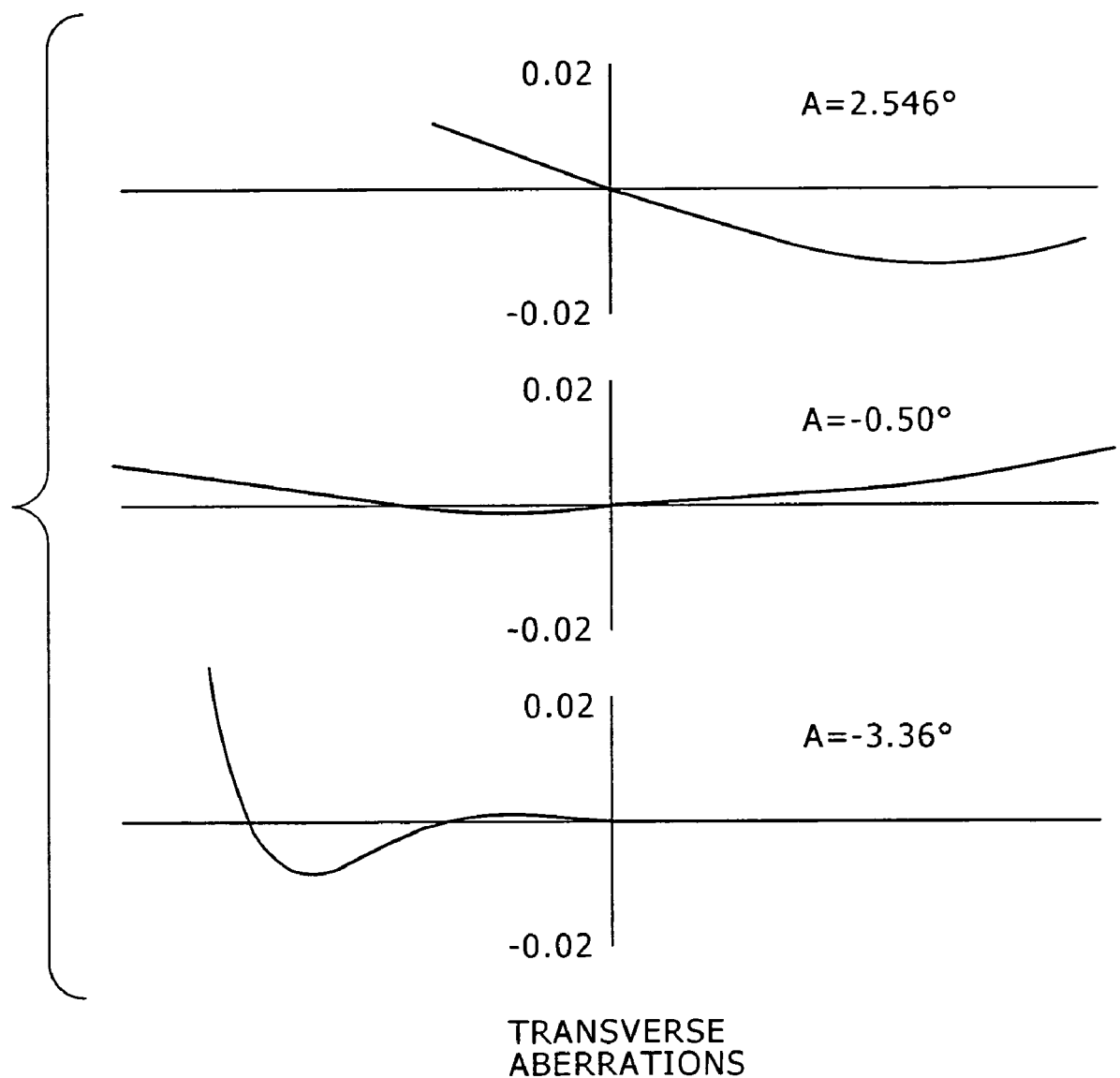
FIG. 22 shows transverse aberrations in the telephoto end mode.

FIGS. 20 to 22, respectively, show transverse aberration diagrams in the state of a lens shift of about 0.5 degrees in the infinite focus modes in accordance with the numerical example 3. Specifically, FIG. 20 shows transverse aberration diagrams in the wide angle end mode (f=2.942), FIG. 21 shows transverse aberration diagrams in the intermediate focal distance mode (f=7.313), and FIG. 22 shows aberration diagrams in the telephoto end mode (f=27.617).

Clearly from the respective aberration diagrams, aberrations are sufficiently compensated for in accordance with the numerical example 1, and excellent imaging performance is produced.

Figure 23:
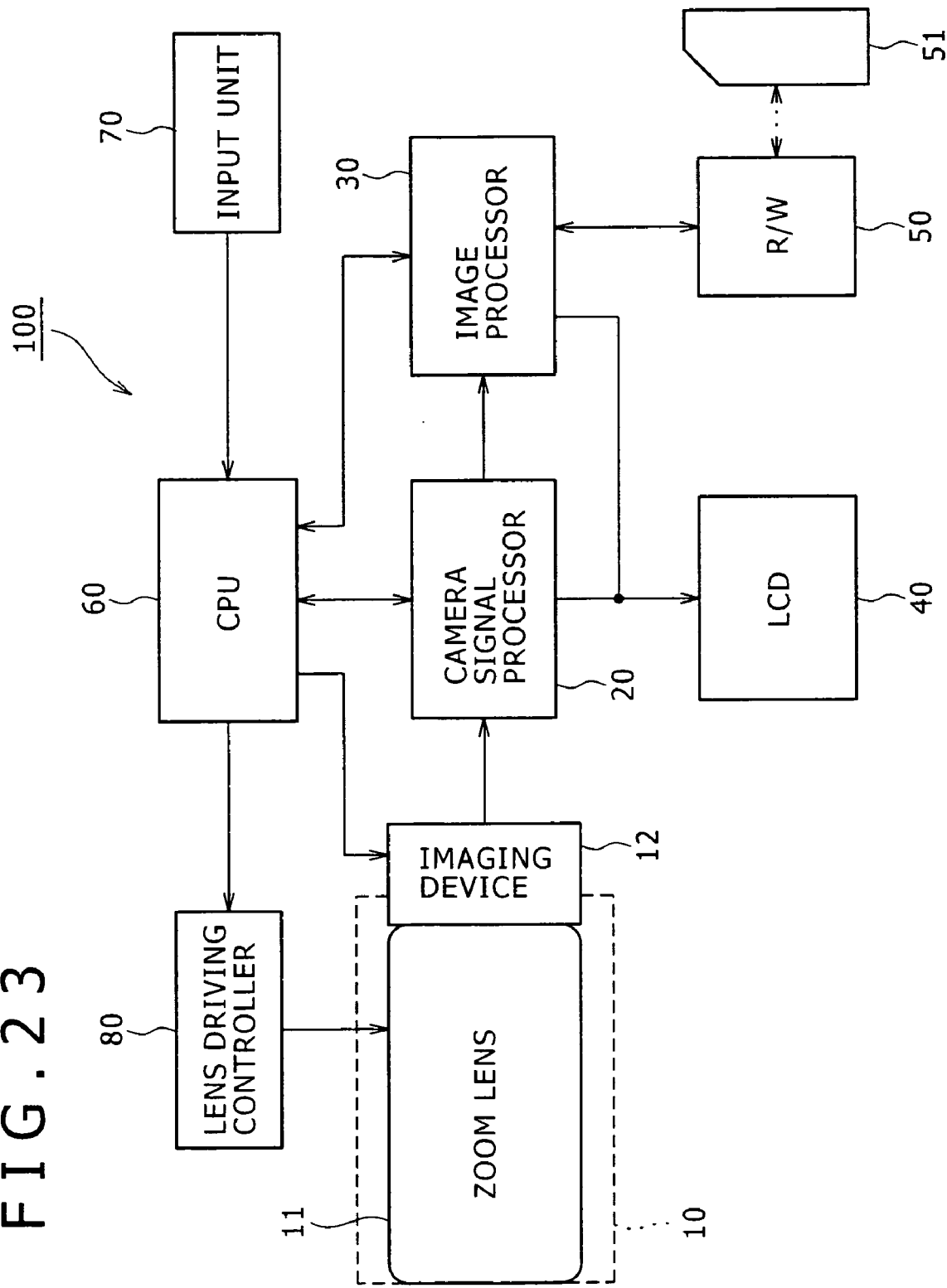
FIG. 23 is a block diagram showing an embodiment of an imaging apparatus according to the present invention (or, "present inventive imaging apparatus", hereafter) adapted to a digital still camera.

FIG. 23 shows an embodiment of an imaging apparatus that uses the present inventive zoom lens. More specifically, the embodiment shown in FIG. 23 is a digital still camera to which the present invention is adapted.

A digital still camera 100 includes a camera block 10 having an imaging function; a camera signal processor 20 that performs signal processing, such as analog-digital conversion, of captured image signals; an image processor 30 that performs recording and/or playback of image signals; an LCD 40 (liquid crystal display) that displays capture images, for example; a R/W 50 (reader/writer) that performs write/read on a memory card 51; a CPU 60 that controls the entirety of the apparatus; an input unit 70 that is used by a user for input operation; and a lens driving controller 80 that controls driving of lenses in the camera block 10. The lens driving controller 80 includes a detection system and a motion blur compensation mechanism. The detection system detects the direction and amount of camera vibration, that is, motion blur, which unexpectedly occurs with a shutter releasing operation. The motion blur compensation mechanism includes a drive system that shifts the positive sub lens group in the fifth lens group G5 along the direction perpendicular to the optical axis by an amount sufficient to cancel the blur of the image in accordance with the detection result of the detection system.

The camera block 10 includes, for example, an optical system and an imaging device 12 such as a CCD. The optical system includes a zoom lens 11 to which the present invention is adapted (the zoom lens according to any one of the embodiments and the numerical examples is usable). The camera signal processor 20 performs processes on output signals of the imaging device 12, including, for example, conversion to a digital signal, and noise elimination, image quality compensation, conversion to brightness, color difference signal. The image processor 30 performs processes on image signals, such as compression encoding and expansion decoding in accordance with predetermined image data formats, and conversion in accordance with data specifications such as resolutions.

The memory card 51 is formed of a detachable semiconductor memory. The R/W 50 writes image data encoded by the image processor 30 into the memory card 51, and reads image data recorded in the memory card 51. The CPU 60 is a controlling unit for controlling respective circuits in the digital still camera in accordance with instruction input signals received from the input unit 70.

The input unit 70 includes, for example, a shutter release button for performing shutter operation and a selection switch for selecting an operation mode, and outputs to the CPU 60 an instruction input signal corresponding to a user operation. The lens driving controller 80 controls, for example, a motor (not shown) for controlling the lenses of the zoom lens 11 in response to a control signal received from the CPU 60.

Operation of the digital still camera will briefly described herebelow.

Under control of the CPU 60, in a capture standby mode, image signal captured by the camera block 10 is output to the LCD 40 through the camera signal processor 20, and the image is displayed as a camera-through image thereon. When an instruction input signal for zooming is input from the input unit 70, the CPU 60 outputs a control signal to the lens driving controller 80, and a predetermined lens of the zoom lens 11 is moved in accordance with control by the lens driving controller 80.

When a shutter (not shown) of the camera block 10 is released (in this event, if a motion blur occurs, then the motion blur compensation mechanism operates to correct for an image shift caused by the motion blur), the captured image signal is output from the camera signal processor 20 to the image processor 30 and is compressed and encoded, and is then converted into digital data in a predetermined data format. The converted data is output to the R/W 50 and written into the memory card 51.

Focusing is performed in such a manner that when the shutter release button is half-pushed or is fully-pushed for recording, the lens driving controller 80 shifts a predetermined lens of the zoom lens 11 in accordance with a control signal received from the CPU 60.

When performing playback of image data recorded in the memory card 51, predetermined image data is read out by the R/W 50 from the memory card 51 in response to the operation performed on the input unit 70 and is expanded and decoded by the image processor 30, and then a playback image signal is output to the LCD 40. In this manner, the playback image is displayed.

Thus, the present embodiment has been described in terms of the example digital still camera to which the present invention is adapted; however, adaptation of the present invention is not limited to digital still cameras, and of course the present invention may be adapted to digital video cameras and other cameras.

While the shapes and constructions of the individual portions are described and shown in detail with reference to the respective embodiments and examples, they are merely practical examples for carrying out the present invention, so that they should not be construed as limiting the technical scope of the invention.

INDUSTRIAL APPLICABILITY

The present invention enables the provision of a compact, light weight zoom lens having high performance and capable of having a motion blur compensation function, and a digital still camera using the zoom lens. The present invention can be widely adapted to apparatuses such as digital video cameras and digital still cameras.

The invention claimed is:

1. A zoom lens comprising lenses arranged in order from an object side into a first lens group having positive refractive power, a second lens group having negative refractive power, a third lens group having positive refractive power, a fourth lens group having positive refractive power, and a fifth lens group having positive refractive power, the zoom lens being characterized in that:

in the event of a shift of a lens position mode from a wide angle end mode to a telephoto end mode, the first lens group is fixed along an optical axis direction, the second lens group moves to an image side, the third lens group is fixed along the optical axis direction, the fourth lens group compensates for a fluctuation in an image plane position due to the shift of the second lens group, and concurrently moves along the optical axis direction in a close-distance focusing event, and the fifth lens group is fixed along the optical axis direction;

an aperture diaphragm is disposed in the vicinity of the third lens group;

the fifth lens group includes a negative sub lens group having negative refractive power and a positive sub lens group having a positive refractive power, wherein the positive sub lens disposed in the fifth lens group has an aspheric surface, and wherein the image can be shifted in conjunction with a shift of the positive sub lens group in a direction substantially perpendicular to the optical axis; and the zoom lens satisfies conditional equation (1):

$$0.6 < f5p/Da < 1.4 \qquad (1)$$

where, f5p=focal distance of the positive sub lens group disposed in the fifth lens group; and Da=length extending along the optical axis to a paraxial image position from a most-imagewise surface of the positive sub lens group disposed in the fifth lens group.

2. The zoom lens according to claim 1, characterized by satisfying conditional equation (2):

$$0.5 < f5p/Db < 1.3 \qquad (2)$$

where,

Db=length extending along the optical axis to the aperture diaphragm from a most-object-side surface of the positive sub lens group disposed in the fifth lens group.

3. The zoom lens according to claim 1, characterized by satisfying conditional equation (3):

$$0.3 < |f5n|/ft < 0.9$$

where, f5n=focal distance of the negative sub lens group disposed in the fifth lens group; and ft=focal distance of a total lens system in the telephoto end mode.

4. The zoom lens according to claim 2, characterized by satisfying conditional equation (3):

$$0.3 < |f5n|/ft < 0.9 \qquad (3).$$

5. The zoom lens according to claim 1, characterized in that:

the positive sub lens group disposed in the fifth lens group includes at least one positive lens and one negative lens; and the zoom lens satisfies conditional equation (4):

$$-5 < C5p \cdot ft < -2 \qquad (4)$$

where,

C5p=curvature (reciprocal of a radius of the curvature) of the most-image-side lens surface of the positive sub lens group disposed in the fifth lens group.

6. The zoom lens according to claim 2, characterized in that:

the positive sub lens group disposed in the fifth lens group includes at least one positive lens and one negative lens; and the zoom lens satisfies conditional equation (4):

$$-5 < C5p \cdot ft < -2 \qquad (4).$$

7. The zoom lens according to claim 3, characterized in that:

the positive sub lens group disposed in the fifth lens group includes at least one positive lens and one negative lens; and the zoom lens satisfies conditional equation (4):

$$-5 < C5p \cdot ft < -2 \qquad (4).$$

8. The zoom lens according to claim 4, characterized in that:

the positive sub lens group disposed in the fifth lens group includes at least one positive lens and one negative lens; and the zoom lens satisfies conditional equation (4):

$$-5 < C5p \cdot ft < -2 \qquad (4).$$

9. An imaging apparatus comprising a zoom lens and an imaging device that converts an optical image formed through the zoom lens to an electric signal, the imaging apparatus being characterized in that:

the zoom lens includes lenses arranged in order from an object side into a first lens group having positive refractive power, a second lens group having negative refractive power, a third lens group having positive refractive power, a fourth lens group having positive refractive power, and a fifth lens group having positive refractive power, the zoom lens being characterized in that:

in the event of a shift of a lens position mode from a wide angle end mode to a telephoto end mode, the first lens group is fixed along an optical axis direction, the second lens group moves to an image side, the third lens group is fixed along the optical axis direction, the fourth lens group compensates for a fluctuation in an image plane position due to the shift of the second lens group, and concurrently moves along the optical axis direction in a close-distance focusing event, and the fifth lens group is fixed along the optical axis direction;

an aperture diaphragm is disposed in the vicinity of the third lens group;

the fifth lens group includes a negative sub lens group having negative refractive power and a positive sub lens group having a positive refractive power, wherein the positive sub lens disposed in the fifth lens group has an aspheric surface, and wherein the image can be shifted in conjunction with a shift of the positive sub lens group in a direction substantially perpendicular to the optical axis; and the zoom lens satisfies conditional equation (1):

$$0.6 < f5p/Da < 1.4 \quad (1)$$

where, f5p=focal distance of the positive sub lens group disposed in the fifth lens group; and Da=length extending along the optical axis to a paraxial image position from a most-imagewise surface of the positive sub lens group disposed in the fifth lens group.

10. The imaging apparatus according to claim 9, characterized by satisfying conditional equation (2):

$$0.5 < f5p/Db < 1.3 \quad (2)$$

where,

Db=length extending along the optical axis to the aperture diaphragm from a most-object-side surface of the positive sub lens group disposed in the fifth lens group.

11. The imaging apparatus according to claim 9, characterized by satisfying conditional equation (3):

$$0.3 < |f5n|/ft < 0.9 \quad (3)$$

where, f5n=focal distance of the negative sub lens group disposed in the fifth lens group; and ft=focal distance of a total lens system in the telephoto end mode.

12. The imaging apparatus according to claim 10, characterized by satisfying conditional equation (3):

$$0.3 < |f5n|/ft < 0.9 \quad (3).$$

13. The imaging apparatus according to claim 9, characterized in that:

the positive sub lens group disposed in the fifth lens group includes at least one positive lens and one negative lens; and the zoom lens satisfies conditional equation (4):

$$-5 < C5p \cdot ft < -2 \quad (4)$$

where,

C5p=curvature (reciprocal of a radius of the curvature) of the most-image-side lens surface of the positive sub lens group disposed in the fifth lens group.

14. The imaging apparatus according to claim 10, characterized in that:

the positive sub lens group disposed in the fifth lens group includes at least one positive lens and one negative lens; and the zoom lens satisfies conditional equation (4):

$$-5 < C5p \cdot ft < -2 \quad (4).$$

15. The imaging apparatus according to claim 11, characterized in that:

the positive sub lens group disposed in the fifth lens group includes at least one positive lens and one negative lens; and the zoom lens satisfies conditional equation (4):

$$-5 < C5p \cdot ft < -2 \quad (4).$$

16. The imaging apparatus according to claim 12, characterized in that:

the positive sub lens group disposed in the fifth lens group includes at least one positive lens and one negative lens; and the zoom lens satisfies conditional equation (4):

$$-5 < C5p \cdot ft < -2 \quad (4).$$

* * * * *